US011295939B2

(12) United States Patent
Takahashi et al.

(10) Patent No.: US 11,295,939 B2
(45) Date of Patent: Apr. 5, 2022

(54) ANALYTICAL DEVICE

(71) Applicants: SHIMADZU CORPORATION, Kyoto (JP); THE DOSHISHA, Kyoto (JP)

(72) Inventors: Hidenori Takahashi, Kyoto (JP); Motoi Wada, Nara (JP); Yuji Shimabukuro, Hirakata (JP)

(73) Assignees: SHIMADZU CORPORATION, Kyoto (JP); THE DOSHISHA, Kyoto (JP)

(*) Notice: Subject to any disclaimer, the term of this patent is extended or adjusted under 35 U.S.C. 154(b) by 531 days.

(21) Appl. No.: 16/394,024

(22) Filed: Apr. 25, 2019

(65) Prior Publication Data

US 2019/0333748 A1 Oct. 31, 2019

(30) Foreign Application Priority Data

Apr. 27, 2018 (JP) .............................. JP2018-086561

(51) Int. Cl.
| | | |
|---|---|---|
| *H01J 49/00* | (2006.01) | |
| *H01J 49/02* | (2006.01) | |
| *H01J 49/10* | (2006.01) | |
| *G01N 27/622* | (2021.01) | |
| *H01J 49/06* | (2006.01) | |
| *H01J 49/26* | (2006.01) | |

(52) U.S. Cl.
CPC ........ *H01J 49/0036* (2013.01); *G01N 27/622* (2013.01); *H01J 49/022* (2013.01); *H01J 49/06* (2013.01); *H01J 49/105* (2013.01); *H01J 49/26* (2013.01)

(58) Field of Classification Search
CPC ...... H01J 49/0036; H01J 49/022; H01J 49/06; H01J 49/105; H01J 49/26; H01J 49/0072; G01N 27/622
USPC ........................................ 250/281, 282, 288
See application file for complete search history.

(56) References Cited

U.S. PATENT DOCUMENTS

2010/0140466 A1* 6/2010 Hartmer .............. H01J 49/0072
250/282
2016/0372311 A1* 12/2016 Takahashi ............... H01J 49/06

FOREIGN PATENT DOCUMENTS

WO WO 2015/133259 A1 9/2015

* cited by examiner

*Primary Examiner* — Michael Maskell
(74) *Attorney, Agent, or Firm* — Oblon, McClelland, Maier & Neustadt, L.L.P.

(57) ABSTRACT

An analytical device includes: a reaction unit into which an ion derived from a sample component is introduced; a radical generation unit that generates a radical by vacuum discharge and comprises a raw material introduction chamber into which a plasma raw material is introduced; a connection part that introduces the radical generated in the radical generation unit into a vacuum chamber, the vacuum chamber having a pressure lower than a pressure of the raw material introduction chamber and being connected to the reaction unit; and a separation unit that separates a generated ion generated by a reaction with the radical introduced via the connection part into the reaction unit according to m/z and/or ion mobility, wherein an inner diameter of a cross section of the connection part is equal to or less than 20 millimeters.

14 Claims, 16 Drawing Sheets

ANALYTICAL DEVICE

INCORPORATION BY REFERENCE

The disclosure of the following priority application is herein incorporated by reference: Japanese Patent Application No. 2018-86561 filed Apr. 27, 2018.

TECHNICAL FIELD

The present invention relates to an analytical device.

BACKGROUND ART

In mass spectrometry, a sample component is analyzed using a mass spectrum that shows peaks corresponding to product ions that are derived by dissociation of ions obtained by ionizing the sample component (the ions derived from the sample component may also be referred to as sample-component-derived ions in the following description while ions prior to being subjected to reactions such as dissociation may be referred to as precursor ions as appropriate) or obtained by causing an atom or an atom group to attach to the ions. In the case where fragment ions obtained by dissociating a precursor ion are analyzed, detailed information on the structure of a molecule such as amino acid sequence can be obtained from a plurality of fragment ions each constituting a part of the molecule contained in the sample component.

Here, in the case of an analysis of peptides, there are possibilities that various types of ions are included in the fragment ions to be obtained such as those derived from the N-terminus side, those derived from the C-terminus side, those resulting from cleavage of N-Cα bonds on the peptide main chain or those resulting from side-chain cleavage. As a result, it has been proposed to identify the peaks in the mass spectrum by utilizing features of the fragment ions generated by a specific dissociation method. PTL 1 discloses generation of c-type ions derived from cleavage of N-Cα bonds which are difficult to generate by collision-induced dissociation (CID) with low energy, utilizing specific reactivity of a hydrogen radical on the peptide main chain.

CITATION LIST

Patent Literature

PTL1: WO2015/133259

SUMMARY OF INVENTION

Technical Problem

When an analysis is to be performed by dissociating a precursor ion or when an analysis is to be performed by attaching an atom or atom group to a precursor ion, it is preferable that a radical other than a hydrogen radical can also be efficiently used. In order to efficiently generate the radical other than a hydrogen radical, a possible approach is to generate the radical by utilizing plasma generated by a high-frequency voltage. However, one of the problems of such an approach is that it is necessary to interconnect a reaction chamber such as an ion trap, which requires a high degree of vacuum, and a radical source, which requires a constant pressure of raw material gas for electric discharge while maintaining each of their degrees of vacuum. Thus, there has been a need for achieving an appropriate device configuration.

Solution to Problem

According to the 1st aspect of the present invention, an analytical device comprises: a reaction unit into which an ion derived from a sample component is introduced; a radical generation unit that generates a radical by vacuum discharge and comprises a raw material introduction chamber into which a plasma raw material is introduced; a connection part that introduces the radical generated in the radical generation unit into a vacuum chamber, the vacuum chamber having a pressure lower than a pressure of the raw material introduction chamber and being connected to the reaction unit; and a separation unit that separates a generated ion generated by a reaction with the radical introduced via the connection part into the reaction unit according to m/z and/or ion mobility, wherein an inner diameter of a cross section of the connection part is equal to or less than 20 millimeters.

According to the 2nd aspect of the present invention, in the analytical device according to the 1st aspect, it is preferred that the radical generation unit comprises an alternating-current coupling circuit, the alternating-current coupling circuit comprising: a high-frequency input part that inputs a high-frequency voltage to the alternating-current coupling circuit; and a matching part configured to change an electrical characteristic of the alternating-current coupling circuit.

According to the 3rd aspect of the present invention, in the analytical device according to the 2nd aspect, it is preferred that a frequency of the high-frequency voltage is 1 MHz or higher but not higher than 300 GHz.

According to the 4th aspect of the present invention, in the analytical device according to the 2nd or 3rd aspect, it is preferred that the high-frequency input part and a power source of the high-frequency voltage are interconnected without a matching device therebetween.

According to the 5th aspect of the present invention, in the analytical device according to any one of the 2nd to 4th aspects, it is preferred that the matching part comprises a movable unit configured to change an impedance of the alternating-current coupling circuit by movement of the movable unit.

According to the 6th aspect of the present invention, in the analytical device according to any one of the 2nd to 5th aspects, it is preferred that the raw material introduction chamber comprises a first electrically conductive body into which the plasma raw material is introduced; and the first electrically conductive body is tubular and constitutes a part of the alternating-current coupling circuit.

According to the 7th aspect of the present invention, in the analytical device according to the 6th aspect, it is preferred that the matching part changes a portion of the first electrically conductive body that is tubular, the portion constituting the part of the alternating-current coupling circuit.

According to the 8th aspect of the present invention, in the analytical device according to the 6th or 7th aspect, it is preferred that the vacuum discharge occurs at the end of the first electrically conductive body that is tubular.

According to the 9th aspect of the present invention, in the analytical device according to any one of the 2nd to 5th aspects, it is preferred that the raw material introduction chamber comprises a tubular dielectric body into which the plasma raw material is introduced; and the radical generation unit comprises a second electrically conductive body wound around the dielectric body, the second electrically conductive body constituting a part of the alternating-current coupling circuit.

According to the 10th aspect of the present invention, in the analytical device according to the 9th aspect, it is preferred that the matching part changes a portion of the second electrically conductive body, the portion constituting the part of the alternating-current coupling circuit.

According to the 11th aspect of the present invention, in the analytical device according to the 9th or 10th aspect, it is preferred that the vacuum discharge occurs inside the tubular dielectric body.

According to the 12th aspect of the present invention, in the analytical device according to any one of the 2nd to 11th aspects, it is preferred that the raw material introduction chamber has an outer wall placed under atmospheric pressure.

According to the 13th aspect of the present invention, in the analytical device according to any one of the 2nd to 12th aspects, it is preferred that the plasma raw material contains at least one raw material gas selected from the group consisting of hydrogen gas, water vapor, nitrogen gas, and air.

According to the 14th aspect of the present invention, in the analytical device according to any one of the 1st to 13th aspects, it is preferred that the generated ion generated in the reaction unit is a first ion resulting from the ion derived from the sample component being dissociated by the reaction with the radicals, a second ion resulting from an atom or atom group attaching to the ion derived from the sample component, or an ion resulting from the second ion being dissociated.

Advantageous Effects of Invention

According to the present invention, it is made possible to generate various types of radicals by using plasma generated by a high-frequency voltage on the basis of an appropriate device configuration that allows a reaction chamber such as an ion trap and a radical source to be kept at their appropriate pressures.

DESCRIPTION OF EMBODIMENTS

Embodiments for implementation of the present invention will be described hereinbelow with reference to the drawings.

Figure 1:
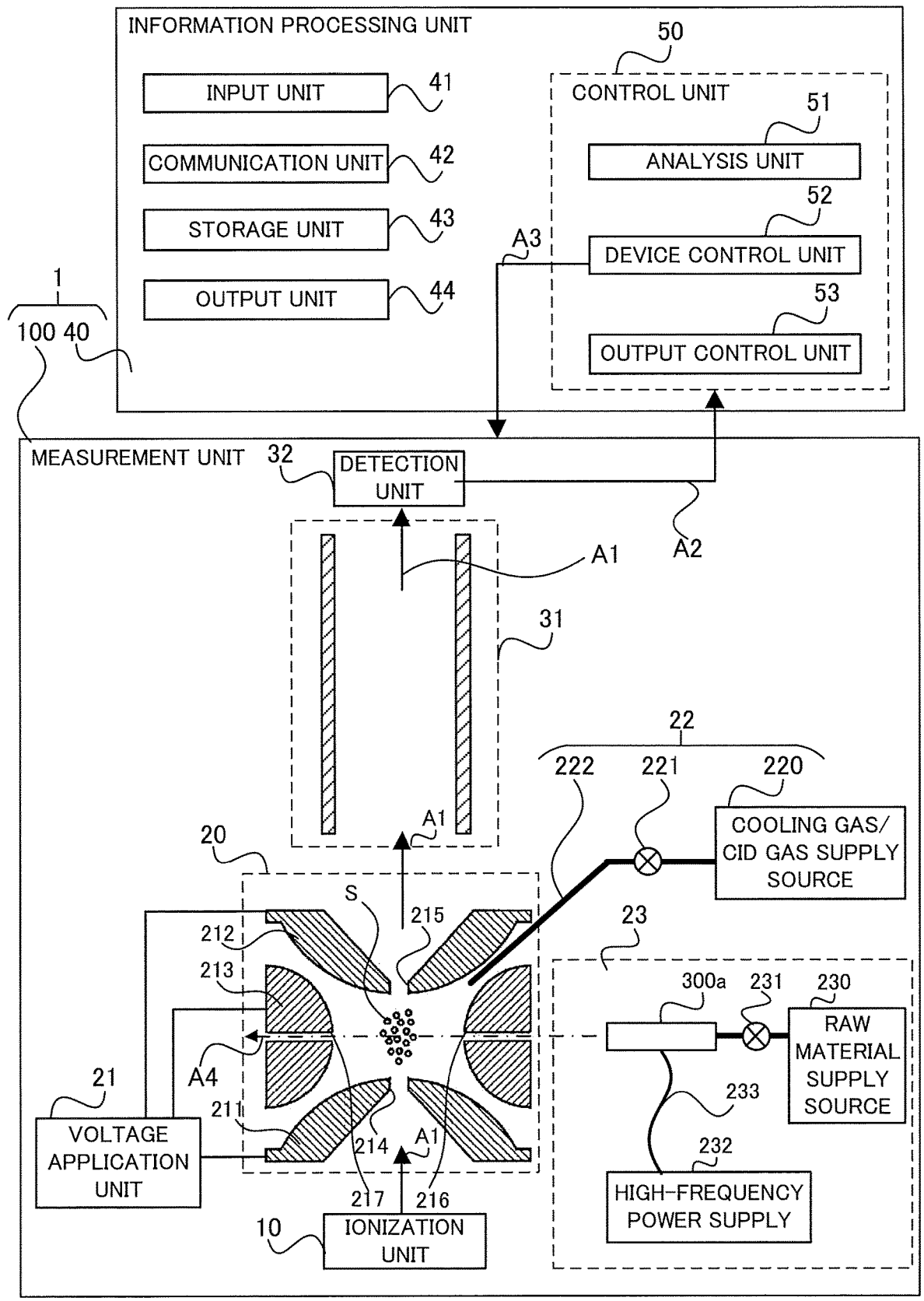
FIG. 1 is a schematic diagram illustrating a configuration of an analytical device according to an embodiment.

FIG. 1 is a conceptual diagram that illustrates a configuration of an analytical device according to this embodiment. The analytical device (analyzer) 1 includes a measurement unit 100 and an information processing unit 40.

The measurement unit 100 includes an ionization unit 10, a reaction unit 20 that stores ions S derived from the sample component, a voltage application unit 21, a cooling gas/CID gas supply unit 22, a radical supply unit 23, a mass separation unit 31, and a detection unit 32.

The reaction unit 20 includes an inlet-side end cap electrode 211, an outlet-side end cap electrode 212, a ring electrode 213, an ion introduction port 214, an ion injection port 215, a radical introduction unit 216, and a radical discharge unit 217. The cooling gas/CID gas supply unit 22 includes a cooling gas/CID gas supply source 220, a valve 221, and a cooling gas/CID gas introduction unit 222. The radical supply unit 23 includes a raw material supply source 230, a valve 231, a high-frequency power supply 232, a coaxial cable 233, and a radical generation unit (radical generator) 300a.

The information processing unit 40 includes an input unit 41, a communication unit 42, a storage unit 43, an output unit 44, and a control unit 50. The control unit 50 includes an analysis unit 51, a device control unit 52, and an output control unit 53. In FIG. 1, the path of the movement of the detected ions S derived from the sample component and the flow of a detection signal thereof are schematically illustrated by the arrows A1 and A2, respectively. Also, the control on the measurement unit 100 by the device control unit 52 is schematically illustrated by the arrow A3. In addition, the direction of movement of radicals supplied from the radical supply unit 23 is schematically illustrated by the arrow A4 in a dot-and-dash line.

The ionization unit 10 of the measurement unit 100 includes an ion source and is configured to ionize the sample component. The method for the ionization is not limited to a particular one and, for example, it is possible to use matrix-assisted laser desorption/ionization (MALDI), electrospray ionization (ESI), etc. The ions S derived from the sample component which have been ionized by the ionization unit 10 moves under an electromagnetic action based on voltages applied to not-shown electrodes, and passes the ion introduction port 214 provided in the inlet-side end cap electrode 211 to be introduced into the reaction unit 20.

The reaction unit 20 includes a vacuum chamber such as an ion trap capable of accommodating ions. The reaction unit 20 generates product ions by causing reaction of the sample-component-derived ions S and the gas that has been introduced into the reaction unit 20 and thereby dissociating the sample-component-derived ions S or attaching an atom or atom group to the sample-component-derived ions S. Accordingly, the vacuum chamber of the reaction unit 20 functions as a reaction chamber. The reaction unit 20 may generate the product ions by further performing dissociation after having performed the above-mentioned attachment to the sample-component-derived ions S. The reaction unit 20 controls, retains, or discharges as appropriate the sample-component-derived ions S by voltages that the voltage application unit 21 applies to the inlet-side end cap electrode 211, the outlet-side end cap electrode 212, and the ring electrode 213 as well as by the cooling gas, etc.

It should be noted that the reaction unit 20 may be configured using a linear ion trap or a collision cell instead of the three-dimensional ion trap illustrated in FIG. 1.

The reaction unit 20 causes a reaction of the sample-component-derived ions S introduced into the reaction unit 20 with the radicals introduced from the radical supply unit 23 via the radical introduction unit 216. In FIG. 1, the radical introduction unit 216 and the radical discharge unit 217 are illustrated as a hole formed in the ring electrode 213 but their shapes are not limited to a particular one. The ions S derived from the sample component become ions having different masses (hereinafter referred to as "mass-changed ions") with oxygen atoms and hydrogen atoms attached thereto or with hydrogen atoms, etc. abstracted therefrom by the reaction with the radicals (hereinafter referred to as "radical reaction").

The analytical device 1 may perform the detection by subjecting the mass-changed ions to mass separation or may perform the detection by subjecting, to mass separation, ions resulting from dissociation of the mass-changed ion. In the case where the mass-changed ion has a radicalized part inside thereof, the mass-changed ion may spontaneously undergo dissociation due to the instability of the radicalized part and become fragment ions. Alternatively, the mass-changed ions become fragment ions when the CID gas is introduced into the reaction unit 20 and the mass-changed ions are dissociated through CID. In addition, the mass-changed ions can be dissociated by gas impact dissociation, laser irradiation dissociation, electron ionization dissociation, electron transfer dissociation, etc.

The voltage application unit 21 includes a power supply capable of applying alternating current and direct current. The voltage application unit applies voltages to the inlet-side end cap electrode 211, the outlet-side end cap electrode 212, and the ring electrode 213 under the control of the device control unit 52 which will be described later, and controls the movement of the ions S derived from the sample component introduced into the reaction unit 20. The inlet-side end cap electrode 211 in which the ion introduction port 214 is formed faces the outlet-side end cap electrode 212 in which the ion injection port 215 is formed with the annular ring electrode 213 residing in between. By the voltage control of the voltage application unit 21, the sample-component-derived ions S are trapped in the reaction unit 20, and the product ions generated in the reaction unit 20 are discharged via the ion injection port 215 into the mass separation unit 31.

The cooling gas/CID gas supply unit 22 supplies the cooling gas and/or CID gas to the reaction unit 20. The cooling gas/CID gas supply source 220 includes a cooling gas storage container (not shown) that contains the cooling gas such as helium and/or a CID gas storage container (not shown) that contains CID gas such as argon. The compositions of the cooling gas and the CID gas are not limited to particular ones. The introduction of the cooling gas and/or CID gas is controlled by opening and closing of a valve 221 provided in the middle of the piping of these gases and controlled by the device control unit 52 which will be described later. The cooling gas/CID gas introduction unit 222 includes a piping that extends until it reaches the reaction unit 20 and introduces the cooling gas and/or CID gas into the reaction unit 20. It is preferable that the radicals are introduced from the radical supply unit 23 after the precursor ions have been subjected to cooling by the cooling gas and have converged at and around the center of the reaction unit 20.

It should be noted that FIG. 1 schematically illustrates only one single line of piping as the cooling gas/CID gas introduction unit 222, etc., but the cooling gas and the CID gas can be individually introduced into the reaction unit 20 using two or more respective lines of piping.

The radical supply unit 23 supplies radicals to the reaction unit 20. The radical generation unit 300a of the radical supply unit 23 generates, as will be described later, high-frequency plasma by vacuum discharge and generates radicals from the high-frequency plasma.

The raw material supply source 230 includes a storage container (not shown) that stores the raw material gas which is a plasma raw material. The plasma raw material preferably contains molecules belonging to one or more molecular groups selected from the group consisting of chlorides, sulfur compounds, fluorides, hydroxides, oxides, and carbides. The plasma raw material more preferably contains molecules of one or more type selected from the group consisting of hydrochloric acid, sodium chloride, sulfuric acid, sodium sulfide, hydrofluoric acid, sodium fluoride, sodium hydrogen carbonate, sodium hydroxide, hydrogen peroxide, carbon dioxide, carbohydrates, and hydrocarbons. In view of availability, it is in particular preferable that the plasma raw material contains molecules of one or more type selected from the group consisting of water, oxygen, nitrogen, air, and hydrogen. In view of ease of handling and ease of analysis using the molecules attached to the precursor ions, it is even more preferable that the plasma raw material contains molecules of at least one type selected from the group consisting of water, oxygen, nitrogen, and air.

The plasma raw material is preferably gaseous and, in the following description, the plasma raw material will be described as gas (referred to as raw material gas). Discharge of the gas from the raw material supply source 230 is controlled by opening and closing of a valve 231 provided in the middle of a piping of the raw material gas and controlled by the device control unit 52 which will be described later. The gas that passed the valve 231 is introduced into the radical generation unit 300a.

The high-frequency power supply 232 applies a high-frequency voltage to the radical generation unit 300a. The frequency of the high-frequency voltage at which the high-frequency power supply 232 makes oscillation is not limited to a particular value as long as it is possible to cause vacuum discharge to occur in the radical generation unit 300a. Considering the fact that a radical source is typically arranged in a mass spectrometry device of typical dimensions as well as other relevant facts, the frequency is preferably 11 MHz or higher, more preferably 30 MHz or higher, and even more preferably 1 GHz or higher. A higher frequency makes it easier to perform occurrence and maintenance of plasma and amplitude of oscillation of an electron induced by the high frequency wave becomes shorter, so that secondary electron emission from an inner wall of a discharge tube is suppressed and thus lifetime of the device is prolonged. When the frequency of the high-frequency voltage at which the high-frequency power supply 232 performs oscillation is too high, it becomes difficult to generate or maintain the plasma. The frequency therefore is preferably not higher than 300 GHz and more preferably not higher than 10 GHz. Considering the fact that the frequency should be less likely to affect other publicly used communications, etc., the frequency is most preferably 13.56 MHz and 2.45 GHz. The high-frequency power supply 232 and the radical generation unit 300a are electrically interconnected by a coaxial cable 233.

The radical generation unit 300a functions as a radical source, applies the high-frequency wave input from the high-frequency power supply 232 to the raw material gas supplied from the raw material supply source 230, generates plasma by vacuum discharge, and generates radicals derived from the raw material gas.

Figure 2:
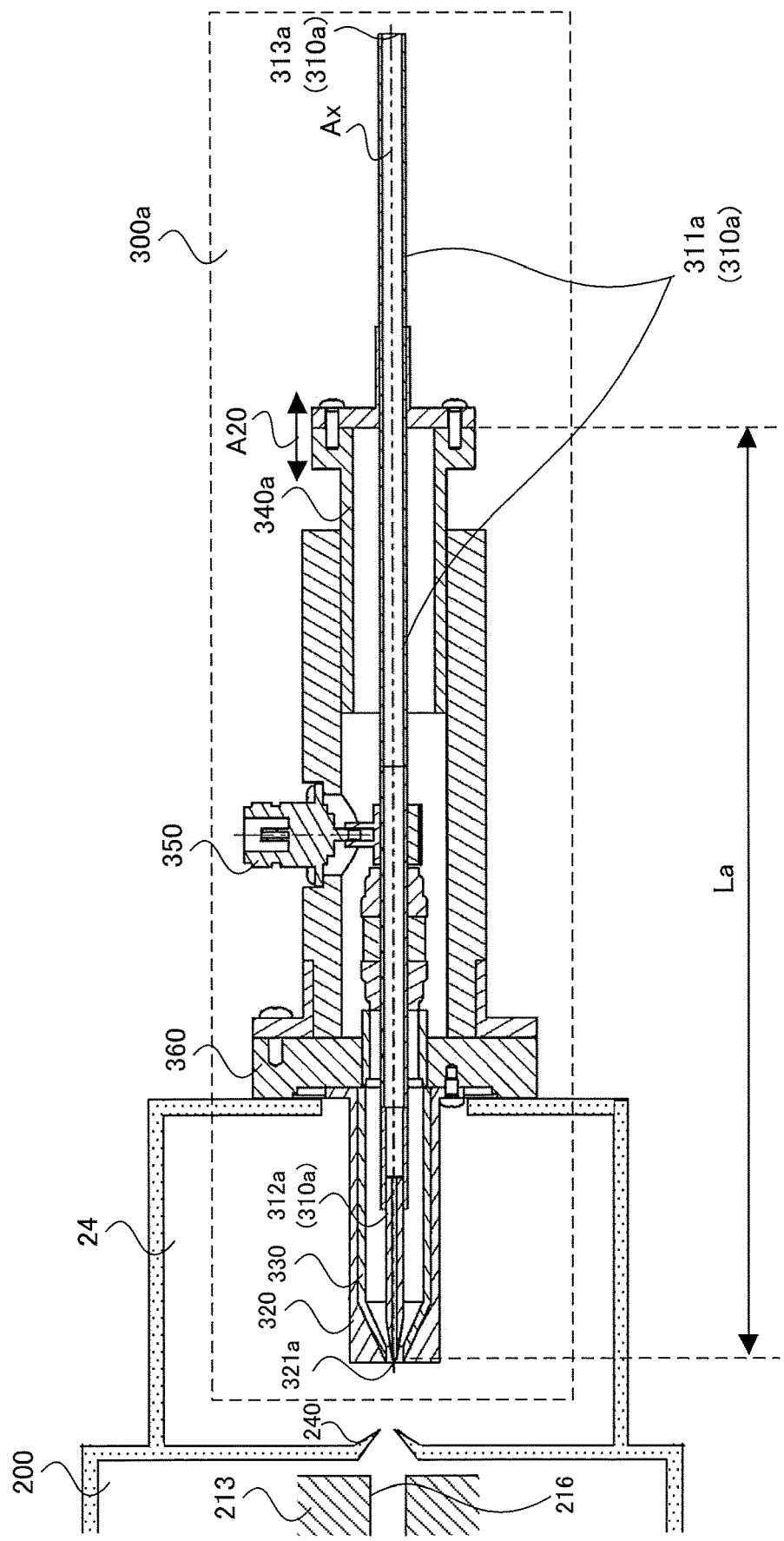
FIG. 2 is a cross-sectional view schematically illustrating a radical generation unit of the analytical device according to the embodiment.

FIG. 2 is a conceptual diagram that schematically illustrates a longitudinal sectional view of the radical generation unit 300a. In this embodiment, the radical generation unit 300a is a high-frequency radical source of a capacitive coupling type. The radical generation unit 300a includes an electrically conductive raw material introduction tube 311a, an electrically conductive capillary 312a, a raw material gas introduction port 313a, a ground electrode 320, a connection part 321a, a glass tube 330, a matching part 340a, a high-frequency input part 350, and a flange 360. The raw material introduction tube 311a, the electrically conductive capillary 312a and the raw material gas introduction port 313a constitute a raw material introduction chamber 310a. The sample introduction tube 311a and the electrically conductive capillary 312a have a cylindrical structure, whose central axes are indicated by a dot-and-dash line Ax.

The high-frequency input part 350, the raw material introduction tube 311a, the electrically conductive capillary 312a, the ground electrode 320 and the matching part 340a constitute an alternating-current coupling circuit. The high-frequency input part 350 includes a coaxial connector such as an N-type connector. The high-frequency input part 350 is connected via the coaxial cable 233 to the high-frequency power supply 232 and applies high-frequency voltage to the alternating-current coupling circuit.

The analytical device 1 includes a reaction unit vacuum container 200 and a connection vacuum container 24. The connection vacuum container 24 interconnects the reaction unit vacuum container 200 and the radical generation unit 300a. The radical generation unit 300a is fixed to the connection vacuum container 24 by the flange 360. The reaction unit vacuum container 200 is connected to a not-shown vacuum pump and controlled such that it has high vacuum or ultra-high vacuum such as $10^{-3}$ Pa or less. The connection vacuum container 24 is connected to a not-shown vacuum pump and controlled such that it has a pressure of several tens of Pa or less. The raw material introduction chamber 310a is connected to a not-shown vacuum pump and controlled such that its internal pressure including the gas pressure of the raw material gas is higher than that of the connection vacuum container 24, for example, 100 Pa.

The connection part 321a is configured by a connection port that interconnects the radical generation unit 300a and the connection vacuum container 24. The connection part 321a interconnects the connection vacuum container 24 and the raw material introduction chamber 310a having different pressures in a state where their different pressures are maintained. The connection part 321a introduces via the connection port the radicals created by the radical generation unit 300a into the connection vacuum container 24.

The inner diameter of the connection part 321a, in particular, the inner diameter of the thinnest portion of the connection part 321a is preferably 20 millimeters or less. The reason is as follows. The radicals generated by the radical generation unit 300a fly inside the connection vacuum container 24 to be introduced into the reaction unit 20 in the reaction unit vacuum container 200. The connection vacuum container 24 and the reaction unit vacuum container 200 are individually differentially evacuated using a turbo molecular pump, etc. and the vacuum is maintained. While a higher flow rate is preferable for the raw material gas considering efficient generation of the radicals, in this case a higher flow rate deteriorates the degree of vacuum of the raw material introduction chamber 310a more significantly, and the radicals that have been generated collide with the background gas, significantly lowering their transport efficiency.

For example, if the raw material gas is air, the mean free path at 10 Pa is about 1 mm. Accordingly, even when the distance from the connection part 321a that releases the radicals to the reaction unit vacuum container 200 is made close to about 1 mm, the radicals that have been generated cannot be transported efficiently due to collision with the background gas if the degree of vacuum of the raw material introduction chamber 310a is not maintained at or lower than about 10 Pa.

In order to set the degree of vacuum of the raw material introduction chamber 310a to 10 Pa, if it is assumed here that evacuation is to be performed using a turbo molecular pump or the like of about 1000 L/s or lower used in a typical mass spectrometry device, then the flow rate of the raw material gas has to be maintained at or lower than $1 \times 10^4$ Pa*L/s (=6000 sccm (standard cc/min)) according to the following expression (1):

$$10 \text{ Pa} \times 1000 \text{ L/s} = 1 \times 10^4 \text{ Pa*L/s} \tag{1}$$

Meanwhile, in order to maintain high frequency discharge by microwave, etc., a gas pressure in the order of 100 Pa is necessary for the raw material introduction chamber 310a.

In addition, if the radius and the length of the connection part 321a into which introduction has been performed at the flow rate of at or lower than $1 \times 10^4$ Pa*L/s as discussed above are a [mm] and L [mm], respectively, then the conductance C of the air of the connection part 321a will be expressed by the following expression (2):

$$C = \alpha \times a^3/L [L/s] \quad (2)$$

where $\alpha$ is a coefficient. Here, the value of the coefficient $\alpha$ is about 12.1 for air. The flow rate Q is expressed by the following expression (3) where $\Delta P$ is the difference between the pressure of the raw material introduction chamber 310a and the pressure of the connection vacuum container 24:

$$Q = \Delta P \times C [Pa*L/s] \quad (3)$$

Here, it is assumed that the pressure of the connection vacuum container 24 is sufficiently low, and the pressure P of the raw material introduction chamber 310a is assigned to $\Delta P$. The following expression (4) results from the expressions (2) and (3):

$$a^3 = QL/\alpha P \quad (4)$$

Accordingly, if L is set to 100 mm considering the size of the plasma system arranged in a typical analytical device, then "a" needs to be about 20 mm or less in order to maintain the gas pressure of the raw material introduction chamber 310a at 100 Pa or more at which discharge is possible.

The inner diameter of the connection part 321a, in particular, the inner diameter of the thinnest portion of the connection part 321a is preferably 20 mm or less, more preferably 12 mm or less, further preferably 6 mm or less, and still more preferably 3 mm or less. As the inner diameter of the connection part 321a is shorter, it can be easier to maintain the difference between the pressure of the connection vacuum container 24 or the reaction unit vacuum container 200 and the pressure of the raw material introduction chamber 310a. The inner diameter of the connection part 321a, in particular, the inner diameter of the thinnest portion of the connection part 321a is preferably $10^{-9}$ m or more, more preferably $10^{-6}$ m or more, and further preferably 0.1 mm or more, in terms of processability.

The raw material gas is introduced into the raw material introduction chamber 310a from the raw material supply source 230 via the raw material introduction port 313a. The raw material gas may be introduced into the raw material introduction chamber 310a in advance before the application of the high-frequency voltage or may be introduced substantially simultaneously with the application of the high-frequency voltage. The raw material introduction tube 311a and the electrically conductive capillary 312a are tubular electrically conductive bodies containing metal such as copper. The electrically conductive capillary 312a constitutes an antenna for high frequency discharge. The high-frequency voltage is applied to the raw material introduction tube 311a and the electrically conductive capillary 312a from the high-frequency input part 350. The outer wall of the raw material introduction tube 311a and the electrically conductive capillary 312a is under the atmospheric pressure and is air-cooled by the ambient atmosphere.

The ground electrode 320 is made of a conductive material containing a metal such as aluminum, and is grounded. The inner wall of the ground electrode 320 is covered by the glass tube 330 apart from a portion on the side of the reaction unit vacuum container 200. Vacuum discharge occurs between the ground electrode 320 and the electrically conductive capillary 312a, the raw material gas becomes plasma and radicals are generated. The radicals that have been generated pass the connection part 321a to be introduced into the connection vacuum container 24. After that, the radicals pass a hole 240 such as a skimmer disposed between the reaction unit vacuum container 200 and the connection vacuum container 24, pass the radical introduction port 216 to be introduced into the reaction unit 20, and the precursor ions are irradiated therewith.

The matching part 340a includes a movable unit. By virtue of the movement of the movable unit, the electrical characteristics of the alternating-current coupling circuit are changed, and output impedance and input impedance are matched. In this embodiment, the movable unit is a plunger. When the plunger is rotated about the central axis Ax of the raw material introduction tube 311a as the axis of rotation, then the plunger moves along the central axis Ax (arrow A20). The matching part 340a including the plunger is grounded. The portion of the raw material introduction chamber 310a from the end on the side of the connection vacuum container of the electrically conductive capillary 312a to the position where it is grounded by the plunger is included in the alternating-current coupling circuit. By virtue of the movement of the matching part 340a, the length La of the portion of the raw material introduction chamber 310a constituting the alternating-current coupling circuit changes, and the impedance of the alternating-current coupling circuit changes. The plunger constituting the movable unit of the matching part 340a may be moved manually by a hand or may be moved by a driving device such as a not-shown motor. When it is manually moved, the matching can be performed in a simple manner. When it is moved by the driving device such as a motor, adjustment can be performed with precision.

Adjustment of the matching by the plunger in the matching part 340a can also be realized by the matching based on the increase and decrease, which change in response to the movement of the plunger, in the reflection high frequency wave such as microwave flowing into the high-frequency power supply 232. By virtue of this, it is made possible to appropriately perform the matching on the basis of the electrical response from the alternating-current coupling circuit. Alternatively, the matching can be realized by adjusting the plunger while monitoring in the matching part 340a whether or not the vacuum discharge has actually occurred using not-shown imaging device such as a camera and a detector such as a photodetector. By virtue of this, it is made possible to appropriately perform the matching based on the state of the electric discharge. Further, the plunger can be adjusted to be placed at a position suitable for the radical reaction while monitoring the reaction between the radicals and the ions in the ion trap, etc. in the reaction unit 20. By virtue of this, it is made possible to appropriately perform the matching on the basis of the amount of the radicals that have been generated. In this case, as ions to be used in the monitoring, fullerene ions (C60) described in the Example are preferable by which a radical reaction can be clearly confirmed.

In a conventional analytical device, with the use of an external matching device such as three-stub tuner or E-H tuner in performing impedance matching between a high-frequency power supply and a circuit into which a high-frequency voltage is input, the following problems (A) to (E) may arise. (A) The stub and the center conductor deteriorate over time, and frequent maintenance is necessary to obtain sufficient matching accuracy. (B) As the matching characteristics change over time, the user needs to perform frequent adjustments, which are cumbersome. (C) Connecting an external matching device increases the size of the system as a whole. (D) As the overall length of the coaxial cable increases, the loss also increases. (E) Although the three-stub tuner can realize the matching in principle whatever load it is, three stubs are operated independently, so that the time required for the operation for the matching is prolonged, which causes an excessive high frequency power to be supplied to the load.

The plasma generation unit 300a according to this embodiment includes an alternating-current coupling circuit integrated with an excitation structure. Since the raw material introduction tube 311a is arranged on the atmospheric pressure side, the radical source can be implemented with enhanced stability by air cooling. Also, since the matching is performed by the matching part 340a, it is not necessary to provide an external matching device. The high-frequency power supply 232 and the high-frequency input part 350 are interconnected without any external matching device in between, which makes it possible to reduce the size of the radical generation unit 300a and shorten the coaxial cable 233. Further, since the matching is performed by adjusting only one portion, i.e., the plunger of the matching part 340a, the matching can be performed quickly. As described in the example of implementation, the analytical device according to this embodiment is capable of electric discharge and generation of radicals with an input power of 10 W or less.

The mass separation unit 31 of FIG. 1 performs mass separation on the ions emitted from the reaction unit 20 on the basis of m/z (mass-to-charge ratio) of the ions. In the following description, the mass separation unit 31 will be described as a time-of-flight mass separation unit because it is capable of appropriately separate the preferably high-molecular-weight molecules such as protein. The mass separation unit 31 includes a vacuum chamber where ions fly inside a flight tube or the like and separates product ions, which have been emitted from the ion injection port 215 and accelerated, on the basis of the time of flight. The specifics of the mass separation unit 31 are not particularly limited. In addition to a liner type illustrated in the figure, a multi-turn type, a reflectron type, or the like can be adopted as appropriate.

It should be noted that the method of the mass separation is not limited to a particular one as long as the product ions generated in the reaction unit 20 and having different m/z values can be separated and detected at a desired resolution. For example, separation function based on the ion trap of the reaction unit 20 or the like may be used.

The detection unit 32 includes an ion detector such as a microchannel plate and detects product ions separated on the basis of the time-of-flight at the mass separation unit 31. A detection signal detected by the detection unit 32 is subjected to analog-to-digital conversion by a not-shown A/D converter and is output to the control unit 50 as measurement data (arrow A2).

The information processing unit 40 includes an information processing device such as an electronic computer and not only functions as an interface with a user as needed but also performs processing such as communication, storage, calculation, etc., on various data.

It should be noted that information processing unit 40 may be configured as one single device integrated with the measurement unit 100. Also, part of the data used by the analytical device 1 may be stored in a remote server or the like, and part of the arithmetic processing performed by the analytical device 1 may be performed by a remote server or the like. At least part of the control on the operations of the individual components of the measurement unit 100 may be performed by the information processing unit 40 or may be individually performed by devices constituting the individual components.

The input unit 41 of the information processing unit 40 is configured to include an input device such as a mouse, a keyboard, various buttons, and/or a touch panel. The input unit 41 receives, from the user, information necessary for controlling the operation of the measurement unit 100, information necessary for the processing that the control unit 50 performs, and other pieces of relevant information.

The communication unit 42 of the information processing unit 40 is configured to include a communication device capable of communications by wired and/or wireless communications via a network such as the Internet. The communication unit 42 transmits a result of analysis of the analysis unit 51 or the like and transmits and receives necessary data as appropriate.

The storage unit 43 of the information processing unit 40 is configured to include a non-volatile storage medium and stores measurement conditions for the measurement unit 100, measurement data output from the measurement unit 100, programs causing the control unit 50 to perform processing, the results of analysis by the analysis unit 51, and the like.

The output unit 44 of the information processing unit 40 includes a display monitor such as liquid crystal monitor, a printer, etc. and is configured to display on the display monitor or print out on a paper medium, the information on the measurement of the measurement unit 100, the results of analysis by the analysis unit 51, images created by the output control unit 53, and the like.

The control unit 50 of the information processing unit 40 includes a processor such as a CPU and is configured to function as the entity that performs the operation for controlling the analytical device 1. The control unit 50 serves as the processing device that performs processing for specifying measurement conditions and the like. The control unit 50 performs various processes by execution of the programs stored in the storage unit 43 and the like by the processor.

The analysis unit 51 of the control unit 50 analyzes the measurement data output from the detection unit 32 and determines the quantities of the product ions. The measurement data includes information on the time of flight and the intensity of ions detected at each time of flight. The analysis unit 51 computes m/z corresponding to time of flight on the basis of calibration data or the like, associates m/z with the detection intensity, and thereby constructs data corresponding to a mass spectrum. The analysis unit 51 is capable of constructing, for example, data corresponding to a MS/MS spectrum including peaks of fragment ions generated from a particular precursor ion.

The analysis unit 51 identifies a peak corresponding to each product ion on the mass spectrum on the basis of data such as mass spectra obtained in the past or a mass spectrum estimated based on a theory based on numerical calculation or an empirical cleavage rule. The analysis unit 51 can perform the identification of the peaks of the mass spectrum with regard to the product ions generated by the radical reaction and/or dissociation using a feature, if any, in the manner of change in mass.

For example, the analysis unit 51 can perform the analysis on the basis of the fact that oxygen atoms tend to attach to methionine and aromatic amino acids when oxygen radicals and precursor ions are reacted. When a plurality of peaks shifted from one another by a mass corresponding to oxygen atom(s) are observed, the analysis unit 51 can identify these peaks as molecules having different numbers of methionine or aromatic amino acids. In this manner, the analysis unit 51 can perform the analysis such as identification of a peak on the basis of specificity of a substance attached by the radical reaction. As another example, if the sample contains peptides, the analysis unit 51 can perform the analysis on the basis of a position on an amino acid sequence which is susceptible to cleavage when dissociation occurs due to a specific radical.

It should be noted that the method of identifying the peaks in the mass spectrum is not limited to a particular one. Also, the user may perform the analysis by viewing the mass spectrum displayed on the output unit 44.

The device control unit 52 of the control unit 50 controls the operation of the measurement unit 100 on the basis of the information on the measurement conditions based on input from the input unit 41 and information stored in the storage unit 43 (arrow A3). The device control unit 52 controls the voltage applied by the voltage application unit 21, supply of the cooling gas and/or CID gas and a gas including radicals, detection conditions of the detection unit 32, and the like.

The output control unit 53 of the control unit 50 creates an output image from data corresponding to the mass spectrum constructed by the analysis unit 51, the measurement conditions of the measurement unit 100, and/or the results of analysis by the analysis unit 51, etc., outputs the output image to the output unit 44, and causes the display monitor to display the output image.

Figure 3:
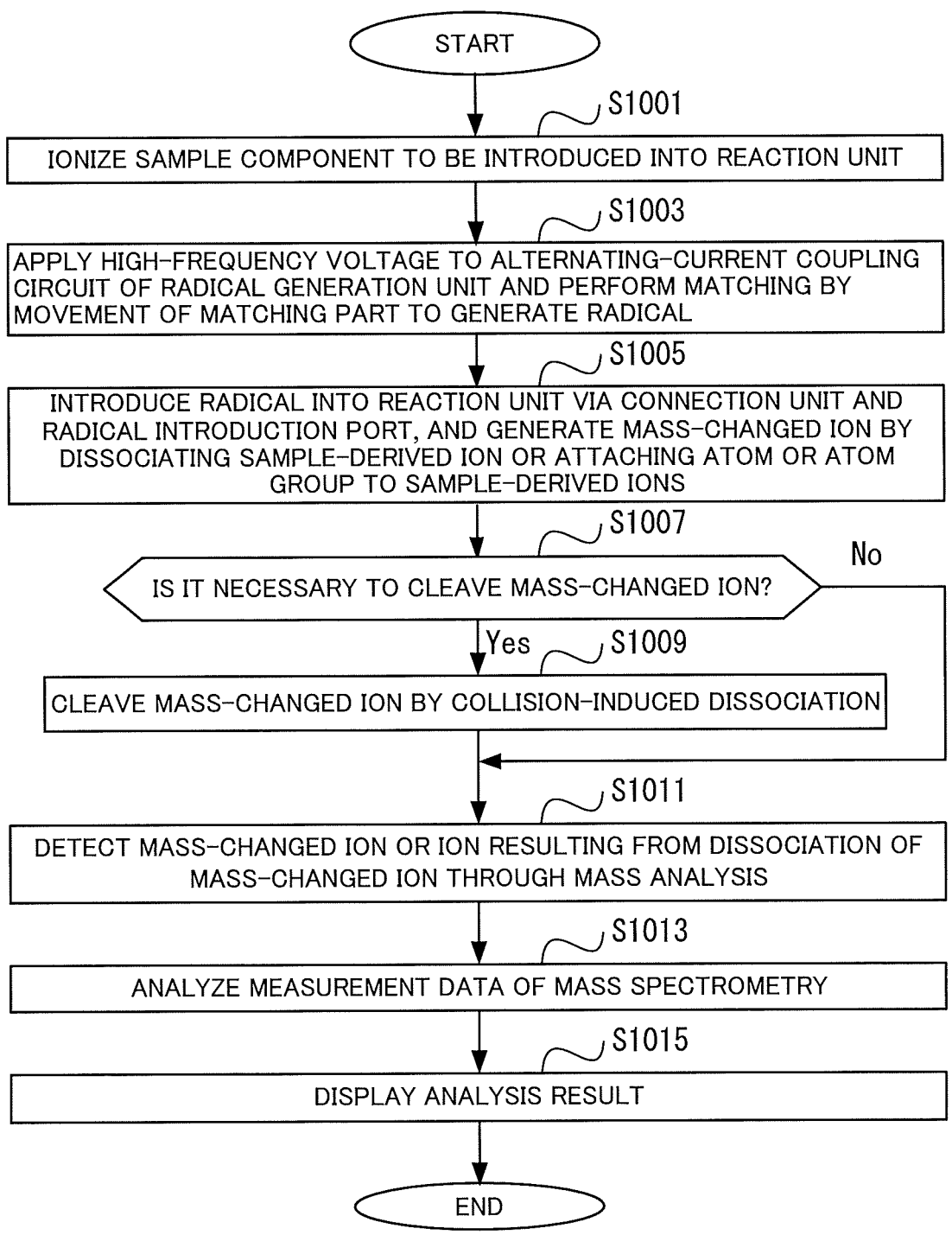
FIG. 3 is a flowchart illustrating a process flow of an analysis method of the embodiment.

FIG. 3 is a flowchart that illustrates a process flow of the analysis method related to this embodiment. In step S1001, the ionization unit 10 ionizes the sample components and introduces the ionized sample components into the reaction unit 20. When step S1001 is completed, step S1003 is started.

In step S1003, the high-frequency input part 350 applies the high-frequency voltage to the alternating-current coupling circuit of the radical generation unit 300a and the matching part 340a generates radicals by performing impedance matching by movement. When step S1003 is completed, step S1005 is started. In step S1005, the analytical device 1 introduces the radicals via the connection part 321a and the radical introduction port 216 into the reaction unit 20, and generates mass-changed ions by dissociating the sample-component-derived ion S or causing an atom or atom group to attach to the sample-component-derived ion S. When step S1005 is completed, step S1007 is started.

In step S1007, the control unit 50 determines whether or not the mass-changed ions that have been generated at step S1005 need to be cleaved on the basis of an instruction or the like from the user that is input in advance from the input unit 41. If it is necessary to cleave the mass-changed ions, then the control unit 50 makes a positive determination at step S1007 and step S1009 is started. If it is not necessary to cleave the mass-changed ions, the control unit 50 makes a negative determination at step S1007 and step S1011 is started.

In step S1009, the cooling gas/CID gas introduction unit 222 introduces the CID gas into the reaction unit 20 and the reaction unit 20 causes the mass-changed ions to be cleaved by CID. When step S1009 has been completed, step S1011 is started. In step S1011, the mass separation unit 31 and the detection unit 32 conduct mass analysis and detect the mass-changed ions or the ions resulting from dissociation of the mass-changed ions as product ions. When step S1011 has been completed, step S1013 is started.

In step S1013, the analysis unit 51 analyzes the measurement data of the mass analysis. When step S1013 has been completed, step S1015 is started. In step S1015, the output unit 44 displays the results of analysis by the analysis unit 51. When step S1015 has been completed, the processing is completed.

According to the above-described embodiment, the following functions and effects can be obtained.

(1) The analytical device 1 according to this embodiment includes the reaction unit 20 into which the sample-component-derived ions S are introduced; the radical generation unit 300a that includes the raw material introduction chamber 310a into which the plasma raw material is introduced, the radical generation unit generating radicals by vacuum discharge; the connection part 321a that introduces the radicals that have been generated in the radical generation unit 300a into the connection vacuum container 24, which has a pressure lower than the pressure of the raw material introduction chamber 310a and is connected to the reaction unit 20; and the mass separation unit 31 that separates the ions generated by a reaction with the radicals introduced via the connection part 321a into the reaction unit 20 on the basis of m/z, where the inner diameter of the cross section of the connection part 321 is 20 mm or less. By virtue of this, the pressure is lowered at the vacuum containers (the reaction unit vacuum container 200 and the connection vacuum container 24) disposed on the separation unit side so as to enable analysis such as the mass spectrometry. In the meantime, the pressure of the raw material introduction chamber 310a is raised so as to efficiently generate the radicals, and the ions to be analyzed can be analyzed using various radicals.

(2) In the analytical device 1 according to this embodiment, the radical generation unit 300a includes the alternating-current coupling circuit. This alternating-current coupling circuit includes the high-frequency input part 350 that inputs the high-frequency voltage to the alternating-current coupling circuit and the matching part 340a that changes the electrical characteristics of the alternating-current coupling circuit. By virtue of this, since the matching is performed by the matching part 340a disposed in the radical generation unit 300a, it is made possible to implement a compact analytical device 1 that can utilize radicals.

(3) In the analytical device 1 according to this embodiment, the high-frequency input part 350 and the power supply of the high-frequency voltage (high-frequency power supply 232) are interconnected without any matching device in between. By virtue of this, since no external matching device is provided, it is made possible to implement a compact analytical device 1.

(4) In the analytical device 1 according to this embodiment, the matching part 340a includes the movable unit (plunger) that changes by movement the impedance of the alternating-current coupling circuit. By virtue of this, it can facilitate the matching by readily understandable operation.

(5) In the analytical device 1 according to this embodiment, only one movable unit is provided for the matching of the alternating-current coupling circuit. By virtue of this, in comparison with a case where matching needs to be performed by operating multiple portions as in the case of a three-stub tuner, the matching can be quickly and readily performed.

(6) In the analytical device 1 according to this embodiment, the raw material introduction chamber 310a includes the first electrically conductive body that is tubular (the raw material introduction tube 311a and the electrically conductive capillary 312a) into which the plasma raw material is introduced. The first electrically conductive body constitutes a part of the alternating-current coupling circuit. By virtue of this, it is made possible to perform the generation of the radicals efficiently using the part of the raw material introduction chamber 310a.

(7) In the analytical device 1 according to this embodiment, the matching part 340a changes a portion of the first electrically conductive body that is tubular, the portion constituting a part of the alternating-current coupling circuit. By virtue of this, it is made possible to achieve quick and easy matching using the tubular structure of the raw material introduction chamber 310a integrated into the alternating-current coupling circuit (8) In the analytical device according to this embodiment, vacuum discharge occurs at the end of the first electrically conductive body that is tubular. By virtue of this, it is made possible to prevent the generated radicals from being coupled again to the electrically conductive raw material introduction tube 311a or the electrically conductive capillary 312a which would lead to loss.

(9) In the analytical device according to this embodiment, the raw material introduction chamber 311a has its outer wall placed under the atmospheric pressure. By virtue of this, since the cooling can be performed by air, it is not necessary to provide a cooling device, and it is made possible to implement a compact analytical device 1.

It should be noted that in the cooling by air-cooling of the radical generation unit 300a, the cooling efficiency can be increased by using compressed air. Also, in order to prevent oxidation of the electrically conductive portion of the radical generation unit 300a in contact with outside air due to heating, it is further desirable that cooling is performed by gas that does not contain oxygen nor moisture such as dry nitrogen.

(10) In the analytical device according to this embodiment, the ions that have been generated in the reaction unit 20 are the first ions resulting from the sample-component-derived ions S being dissociated by a reaction with the radicals, or the second ions resulting from the atom or atom group attaching to the sample-component-derived ions S or ions resulting from the second ions being dissociated. By virtue of this, it is made possible to perform the identification of the peaks in the mass spectrum based on the measurement data using the position at which an ion is likely to be cleaved in the dissociation by the radicals or the mass of the atom or atom group attached.

The following variations also fall within the scope of the present invention and they can be combined as appropriate with the above-described embodiment. In the following variations, the portions or members exhibiting the same structures and/or functions as those in the above embodiment are referred to by the same reference numerals with explanations thereof omitted as appropriate.

Variation 1

In the above-described embodiment, the analytical device 1 includes the radical generation unit 300a that is configured as a capacitively coupled high-frequency radical source, but the analytical device 1 may include an inductively coupled high-frequency radical source.

Figure 4:
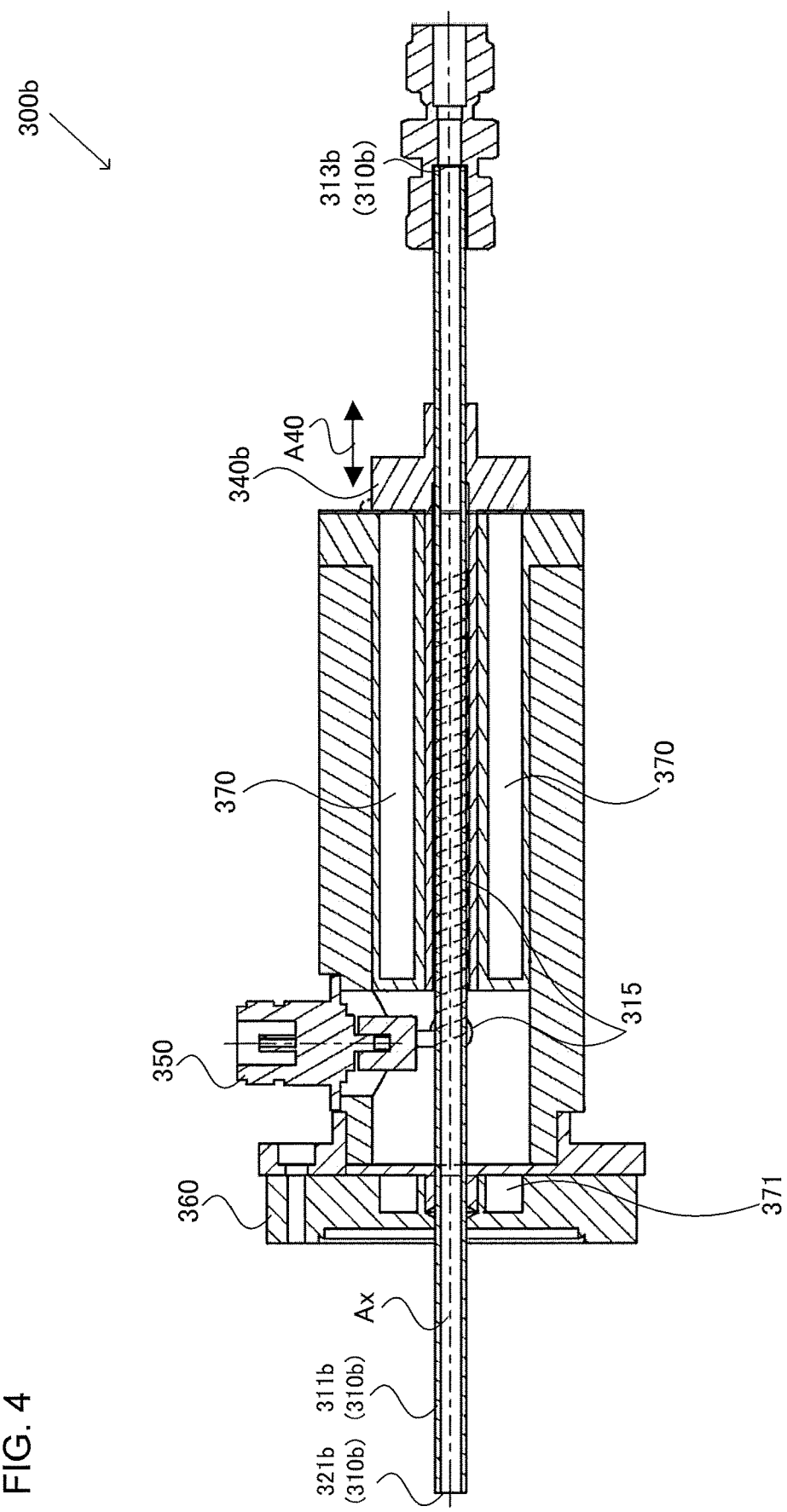
FIG. 4 is a cross-sectional view schematically illustrating the radical generation unit in a Variation.

FIG. 4 is a conceptual diagram that schematically illustrates the longitudinal section of a radical generation unit 300b according to this Variation. In the Variation, the radical generation unit 300b is an inductively coupled high-frequency radical source. The radical generation unit 300b includes a raw material introduction tube 311b, a raw material gas introduction port 313b, a electrically conductive ribbon 315, a connection part 321b, a matching part 340b, a high-frequency input part 350, a flange 360, and magnets 370, 371. The raw material introduction tube 311b, the raw material gas introduction port 313b, and the connection part 321b constitute a raw material introduction chamber 310b. The raw material introduction tube 311b has a cylindrical structure, the central axis of which is indicated by a dot-and-dash line Ax. The central axis Ax also substantially coincides with the central axes of the magnet 370 and the matching part 340b.

The raw material gas is introduced into the raw material introduction chamber 310b from the raw material supply source 230 via the raw material introduction port 313b. The raw material introduction tube 311b is a tubular dielectric body and is configured to contain alumina, etc. The raw material introduction tube 311b is arranged in parallel with the central axis of the hollow cylindrical magnet 370. An electrically conductive ribbon 315 is wound around the portion of the raw material introduction tube 311b facing the magnet 370, and the electrically conductive ribbon 315 becomes an antenna for the high frequency waves.

The high-frequency input part 350 and the electrically conductive ribbon 315 constitutes an alternating-current coupling circuit. The high-frequency input part 350 applies the high-frequency voltage output from the high-frequency power supply 233 to the electrically conductive ribbon 315. The magnets 370, 371 have its north pole on its end along the central axis Ax of the raw material introduction tube 311b and its south pole at the other end. The magnets 370, 371 generate a magnetic field inside the raw material introduction tube 311b and, on the basis of the electromagnetic action based on this magnetic field, generation and maintenance of the plasma by the high-frequency voltage applied to the electrically conductive ribbon 315 are facilitated.

The matching part 340b includes a plunger which is a movable unit. This plunger is made of electrically conductive material such as metal and is grounded. The plunger is in contact with the electrically conductive ribbon 315 between the magnet 370 and the raw material introduction tube 311b. The matching part 340b changes the inductance of the alternating-current coupling circuit by moving in the direction along the central axis Ax of the plunger, and performs impedance matching on the high-frequency power supply 232 and the alternating-current coupling circuit (arrow A40).

Figure 5:
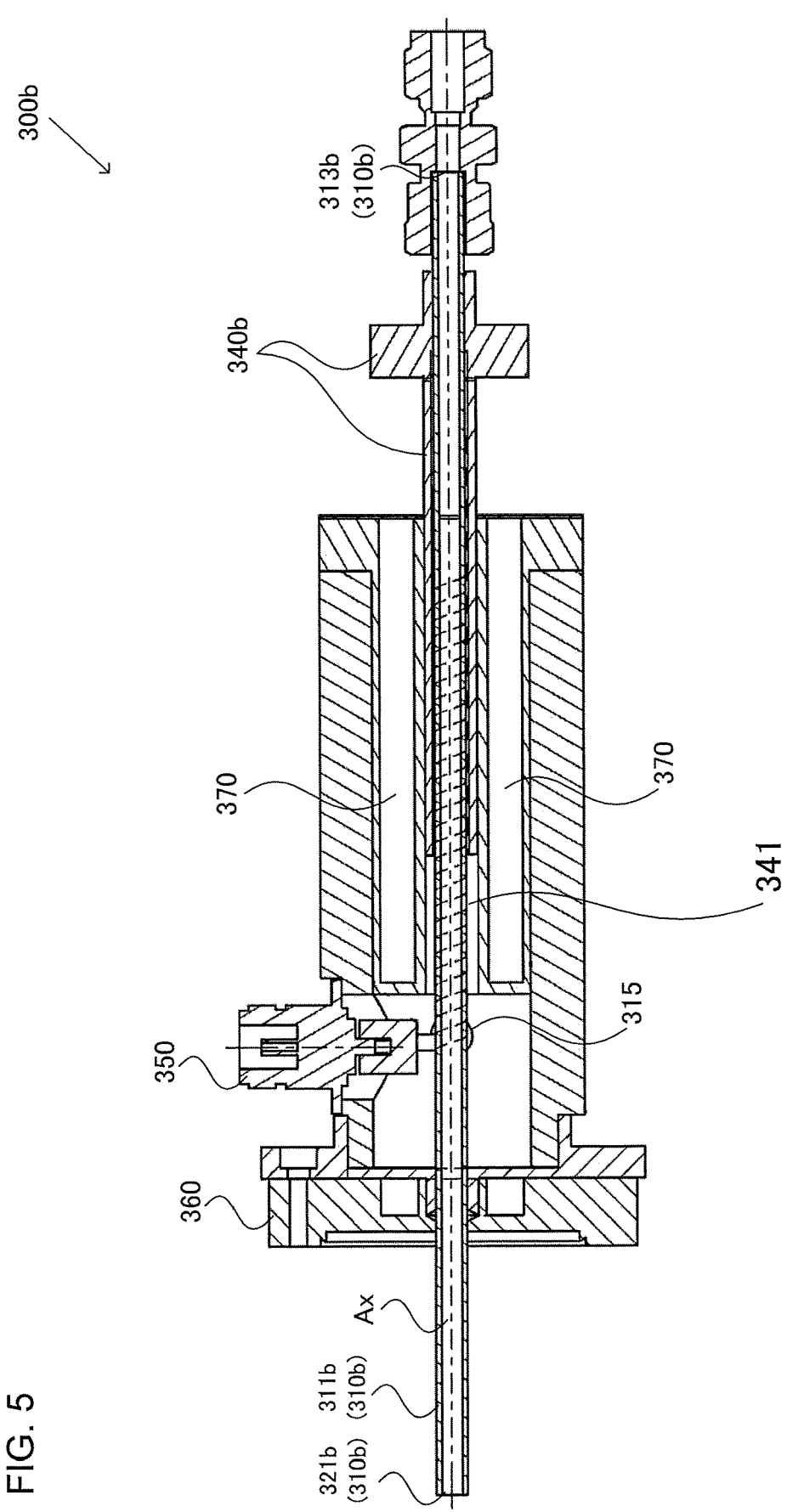
FIG. 5 is a cross-sectional view schematically illustrating the radical generation unit in the Variation.

FIG. 5 is a conceptual diagram that illustrates the radical generation unit 300b according to this Variation after the plunger of the matching part 340b has been moved from the position in FIG. 4. The matching part 340b moves along the central axis Ax by being rotated about the central axis Ax as the axis of rotation. When the plunger has moved, then the gap 341 is created between the magnet 370 and the raw material introduction tube 311b. A part of the electrically conductive ribbon 315 facing the gap 341 is not in contact with the electrically conductive plunger and accordingly is not grounded, so that it functions as an antenna constituting a part of the alternating-current coupling circuit. When the length of the part of the electrically conductive ribbon 315 that is not in contact with the plunger changes, the inductance of the alternating-current coupling circuit also changes, as a result of which the impedance matching is performed.

It should be noted that the form of the antenna is not limited to a ribbon as long as a metallic layer functioning as an antenna for the high frequency wave can be arranged around the raw material introduction tube 311b constituted by a dielectric body.

When matching is performed by the matching part 340b and vacuum discharge occurs inside the raw material introduction tube 311b, then the radicals generated by high frequency plasma are introduced via the connection part 321*b* into the connection vacuum container 24 (FIG. 2).

The connection part 321*b* is configured by a connection port that interconnects the radical generation unit 300*b* and the connection vacuum container 24 and interconnects the connection vacuum container 24 and the raw material introduction chamber 310*b* having different pressures in a state where their pressures are maintained. The inner diameter of the connection part 321*b*, in particular the inner diameter of the thinnest portion of the connection part 321*b* is preferably 20 mm or less as in the above-described embodiment, more preferably 12 mm or less, further preferably 6 mm or less, and even more preferably 3 mm or less. Also, the inner diameter of the connection part 321*b*, in particular the inner diameter of the thinnest portion of the connection part 321*b* is preferably 0.1 mm or more and more preferably 1 mm or more. The connection part 321*b* introduces the radicals generated in the radical generation unit 300*b* via the above-described connection port into the connection vacuum container 24.

The radicals that have been introduced into the connection vacuum container 24 passes the hole 240 provided between the reaction unit vacuum container 200 and the connection vacuum container 24, pass the radical introduction unit 216, and are introduced into the reaction unit 20 (see FIG. 2).

In the analytical device according to this Variation, the raw material introduction chamber 310*b* includes a tubular dielectric body (raw material introduction tube 311*b*) into which the plasma raw material is introduced. The radical generation unit 300*b* includes a second dielectric body (electrically conductive ribbon 315) wound around the dielectric body. The second dielectric body constitutes a part of the alternating-current coupling circuit. By virtue of this, since the vacuum discharge occurs inside the raw material introduction tube 311*b* and the inner wall of the raw material introduction tube 311*b* is not metallic, it is made possible to prevent the radicals generated by the vacuum discharge from combining again with the inner wall of the raw material introduction tube 311*b* which would lead to loss.

In the analytical device according to this Variation, the matching part 340*b* changes a portion of the second dielectric body wound around the raw material introduction tube 311*b*, the portion constituting a part of the alternating-current coupling circuit. By virtue of this, it is made possible to achieve quick and easy matching using the structure of the electrically conductive ribbon 315 integrated with the alternating-current coupling circuit.

In the analytical device according to this Variation, vacuum discharge occurs inside the tubular dielectric body (raw material introduction tube 311*b*). By virtue of this, vacuum discharge can be performed for a wide range and radicals can be efficiently generated.

Variation 2

In the above-described embodiment, the radical supply unit 23 is implemented on a mass analytical device and the ions that have been generated by the radical reaction is separated by the mass separation unit 31 according to m/z so as to be detected by the detection unit 32. However, the radical supply unit 23 may be implemented on an ion mobility analytical device and the ions that have been generated by the radical reaction may be separated according to ion mobility. Further, the ions that have been generated by the radical reaction may be separated by a separation unit that performs separation according to both m/z and ion mobility to be detected. By virtue of this, the ions that have been generated by the radicals can be analyzed in more detail on the basis of ion mobility.

The present invention is not limited to what is described in the above embodiment. Other embodiments considered within the technical idea of the present invention are also included within the scope of the present invention.

EXAMPLES

Whilst Examples will be described below, the present invention is not limited by analysis conditions or the like in the following Examples.

Example 1

Water vapor was introduced into a capacitively coupled microwave radical source having the same structure as the one illustrated in the example of FIG. 2 and the fullerene ions held by an ion trap were irradiated with a gas containing atoms generated by high-frequency (2.45 GHz) vacuum discharge and the like. Mass separation was performed by a time-of-flight mass spectrometer to acquire mass spectra for the case where irradiation was not performed (0 s), the case where irradiation was performed for 0.25 seconds (0.25 s), and the case where irradiation was performed for one second (1 s), respectively.

Figure 6:
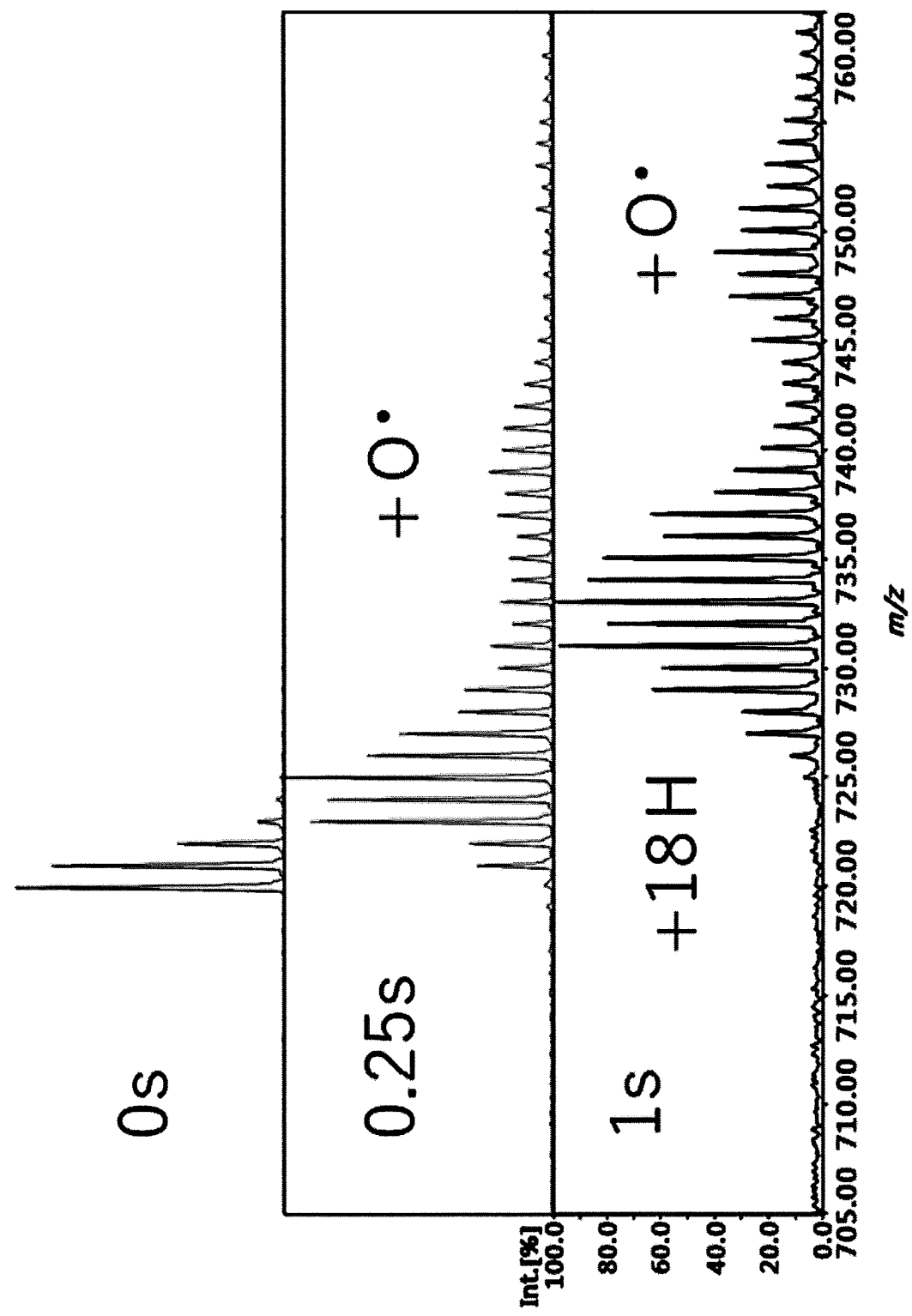
FIG. 6 shows mass spectra showing attachment of radicals to fullerene ions.

FIG. 6 is a diagram that shows the mass spectra obtained in this Example. The upper row corresponds to the case where the irradiation time was 0 second, the middle row corresponds to the case where the irradiation time was 0.25 seconds, and the lower row corresponds to the case where the irradiation time was 1 second. Here, the reaction of a monovalent fullerene ion with n hydrogen radical(s) or oxygen radical(s) is represented by the following reaction formula (10):

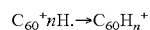

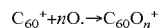

(10)

The molecular weight of fullerene ion is about 720. When a hydrogen radical is attached thereto, the molecular weight changes by about 1. When an oxygen radical is attached thereto, the molecular weight changes by about 16. From the mass spectra of FIG. 6, it will be appreciated that, in response to increase in the irradiation time the number of hydrogen atoms adhering to a fullerene ion increases and the proportion of the fullerene ions to which oxygen atom(s) is attached also increases. From this fact, it has been confirmed that the atomic species derived from microwave plasma source can be used in a reaction for generating product ions for mass spectrometry.

Example 2

Radicals were generated by the same method as in the Example 1 and fullerene ions were irradiated with the radicals. The irradiation time of the radicals was 1 second, and the input power from a high-frequency power supply was changed from 0 W to 45 W and, for each of these cases, mass separation was performed by the time-of-flight mass spectrometer and the mass spectra were acquired. The introduced amount of a raw material gas in this Example was 100 sccm and the radius of a connection port in a radical generation unit for connection to an ion-trap-side vacuum container (which corresponds to the above-described connection vacuum container 24) was 1.5 mm.

Figure 7:
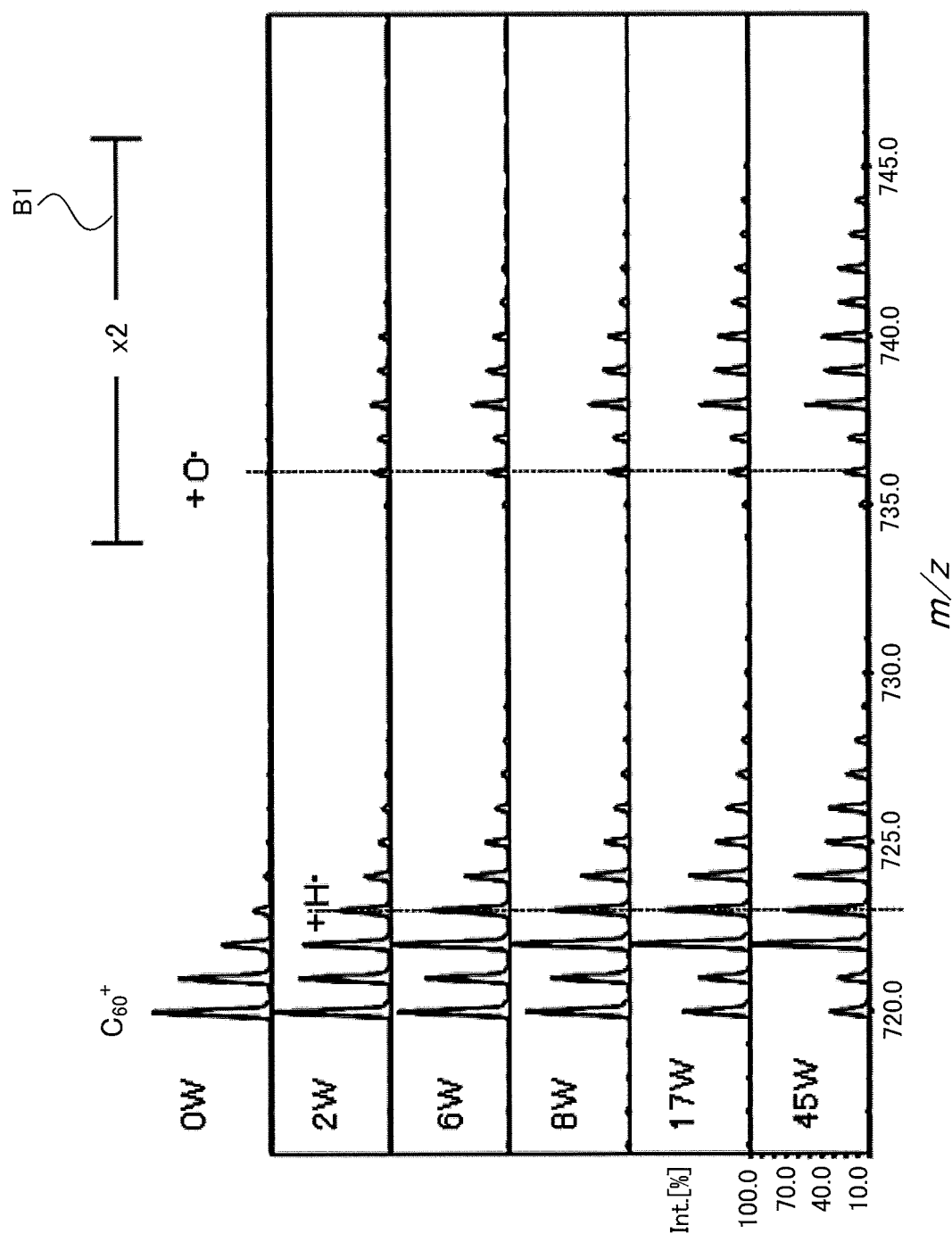
FIG. 7 shows mass spectra showing attachment of radicals to fullerene ions.

FIG. 7 is a diagram that shows mass spectra obtained in this Example. FIG. 7 shows the mass spectra when the input voltages are 0 W, 2 W, 6 W, 8 W, 17 W, and 45 W from the top. The symbol "×2" in the figure indicates that the graph corresponding to m/z within the range indicated by the line B1 is enlarged to two times in comparison with the remaining portions. In the case where the reaction time is 1 second, clear attachment reactions of hydrogen atoms and oxygen atoms can be observed even when the input power is about 2 W. From this result, it will be appreciated that a sufficient amount of radials for causing an ion reaction in an ion trap can be generated even at an extremely low electrical power.

Example 3

Water vapor was introduced into a capacitively coupled microwave radical source having the same structure as the one illustrated in the example of FIG. 2 and peptides (substance P, molecular weight: 1346 Da) held by an ion trap were irradiated with a gas containing atoms generated by high-frequency (2.45 GHz) vacuum discharge and the like. The irradiation time was 1 second. The obtained ions were subjected to mass separation and detected by a time-of-flight mass spectrometer and a mass spectrum was created.

Figure 8:
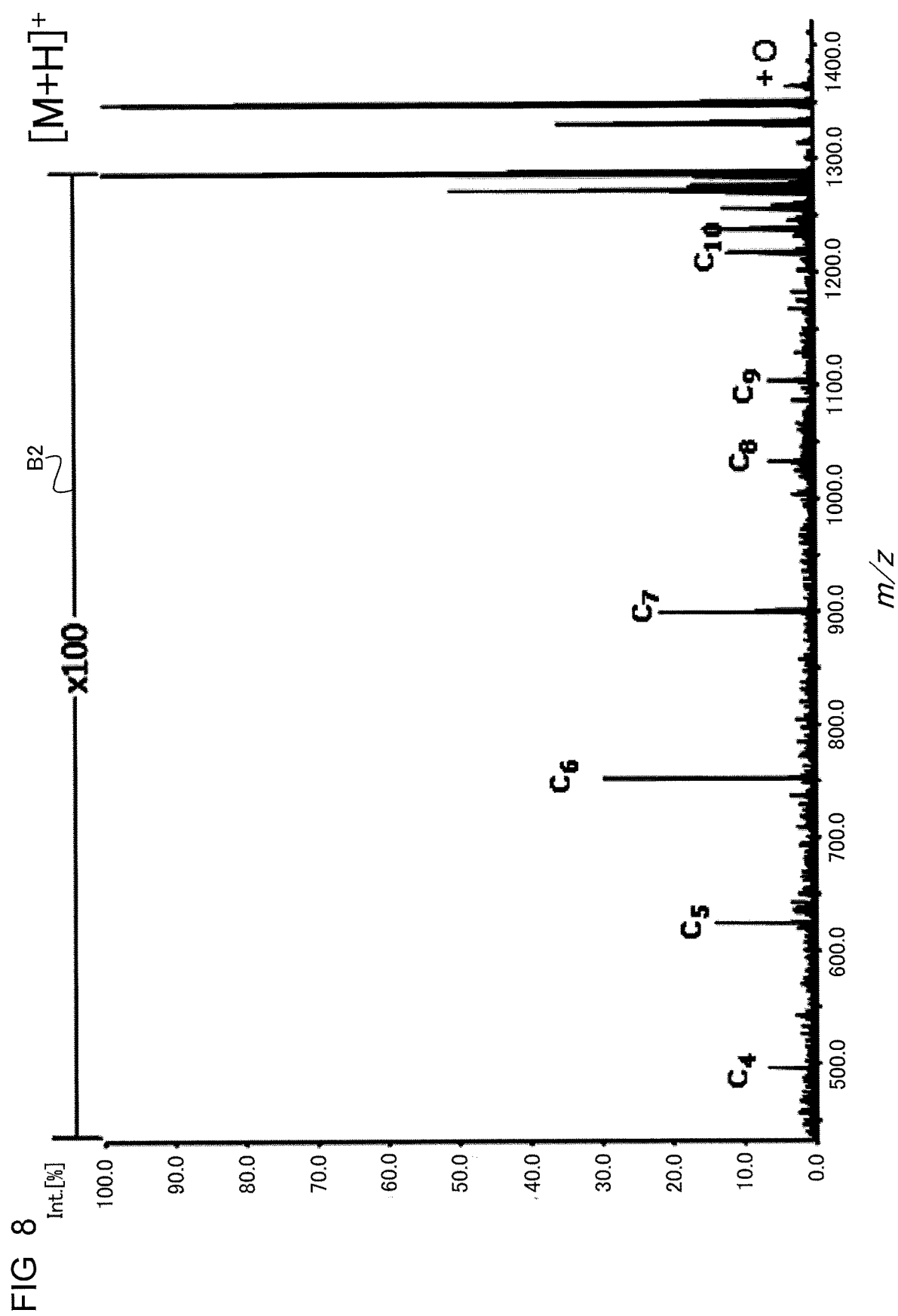
FIG. 8 shows a mass spectrum showing fragment ion peaks of substance P cleaved by radicals.

FIG. 8 is a diagram that shows the mass spectrum obtained in this Example. The symbol "×100" in the figure indicates that the graph corresponding to m/z in the range indicated by the line B2 is enlarged to 100 times in comparison with the remaining portions. $C_4$ to $C_{10}$ in the mass spectrum indicate peaks corresponding to c-type ions generated by cleavage induced by the radicals. The mass spectrum according to this Example was also obtained by applied electric power of several watts and the effect of the reduction in the radius of the microwave radical source will also be obvious in actual cleavage of a peptide.

Example 4

Hydrogen, water vapor, and nitrogen were individually introduced as the raw material gas into a capacitively coupled microwave radical source having the same structure as the one illustrated in the example of FIG. 2 to cause high-frequency (2.45 GHz) vacuum discharge to generate radicals. The inner diameter (radius) of the opening of the capacitively coupled microwave radical source constituting a connection part for connection to a connection vacuum container was 4 mm and an emission spectrum was acquired with an exposure time of 10 msec at a position 17 mm from the opening.

Figure 9A:
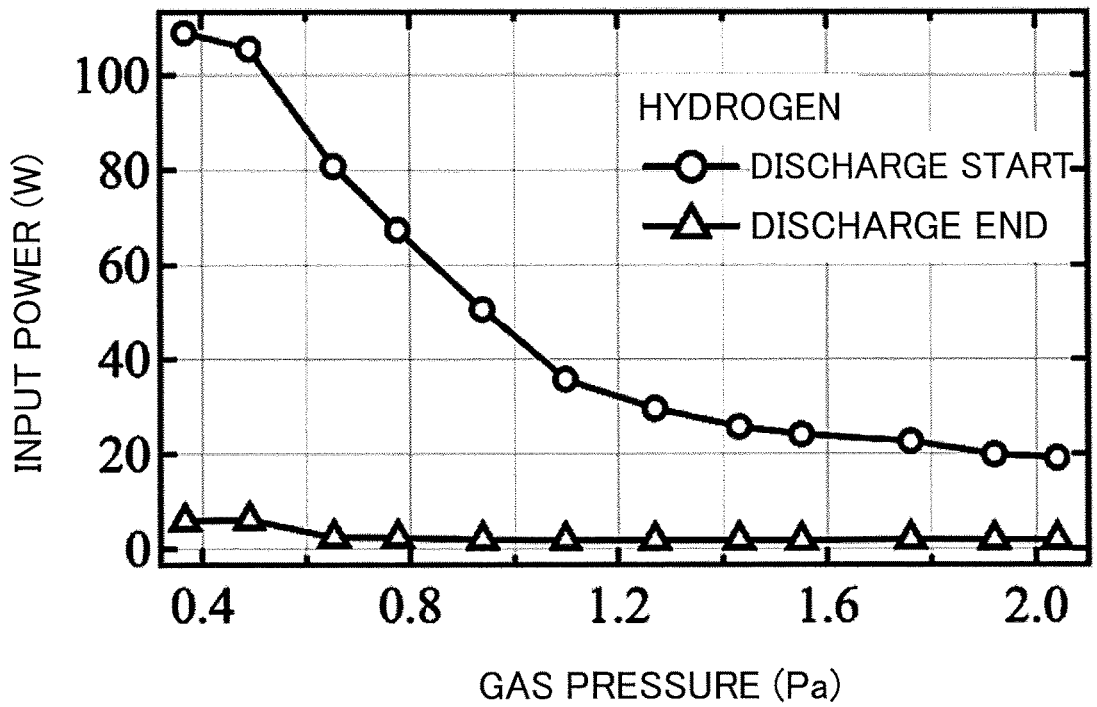
FIG. 9A shows a graph showing discharge characteristics of a radical source according to an Example with hydrogen being used as a raw material gas.
Figure 9B:
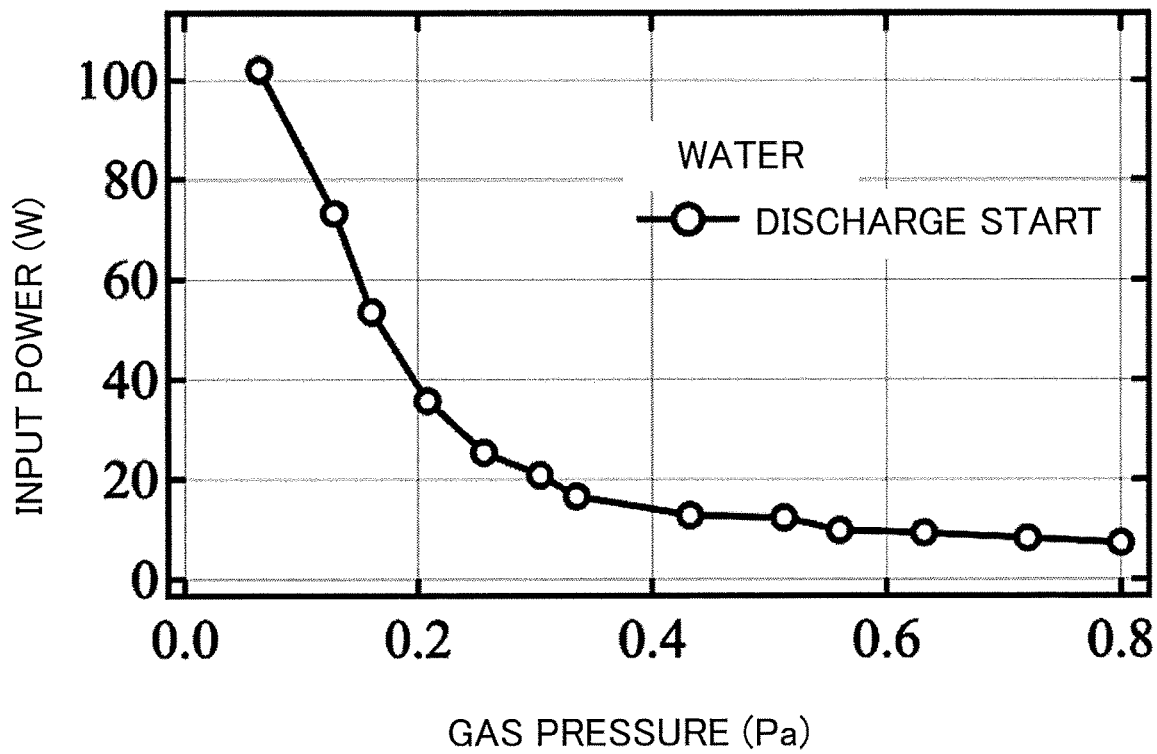
FIG. 9B shows a graph showing the discharge characteristics of the radical source according to an Example with water vapor being used as the raw material gas.

FIG. 9A is a graph showing the discharge characteristics of the radical source according to this Example in the case where hydrogen is used as the raw material gas. The input powers at the start of discharge and at the end of discharge with respect to the pressure of hydrogen gas are shown. FIG. 9B is a graph showing the discharge characteristics of the radical source according to this Example in the case where water vapor is used as the raw material gas. The input power at the start of discharge with respect to the pressure of water vapor is shown.

Figure 10A:
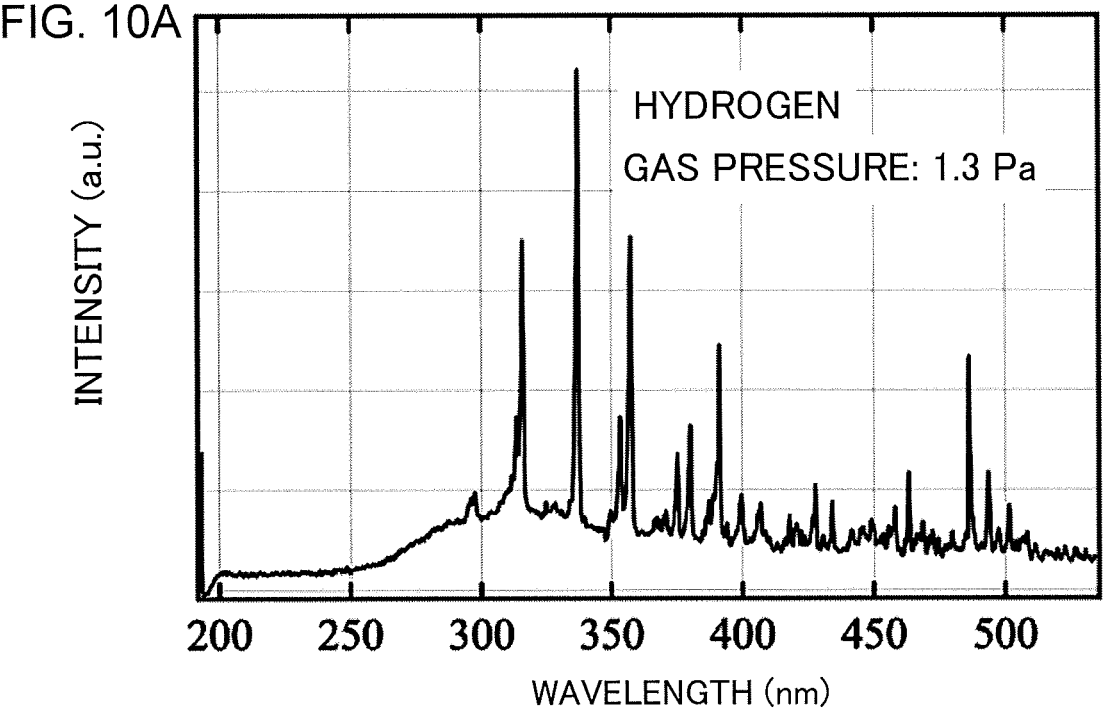
FIG. 10A shows an optical spectrum of a gas generated using hydrogen as the raw material gas in the radical source according to the Example.
Figure 10B:
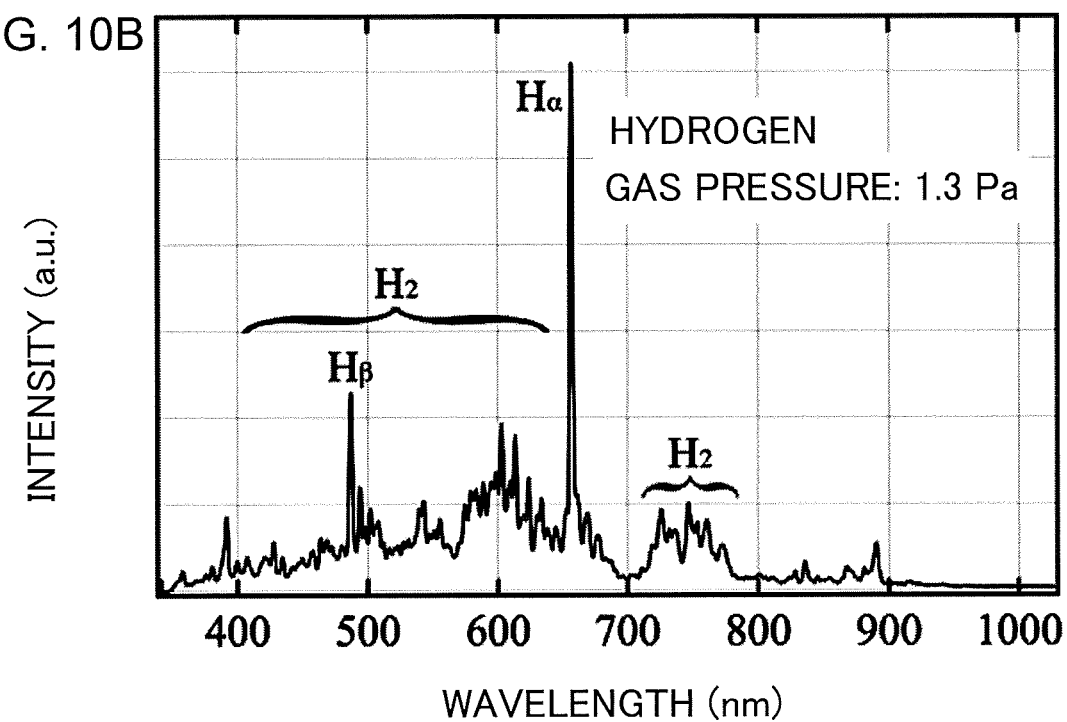
FIG. 10B shows an optical spectrum of the gas generated using hydrogen as the raw material gas in the radical source according to the Example.

FIGS. 10A and 10B are optical spectra of the gas generated using hydrogen as the raw material gas in the radical source according to this Example. The pressure of the hydrogen gas introduced into the radical source was 1.3 Pa.

Figure 11A:
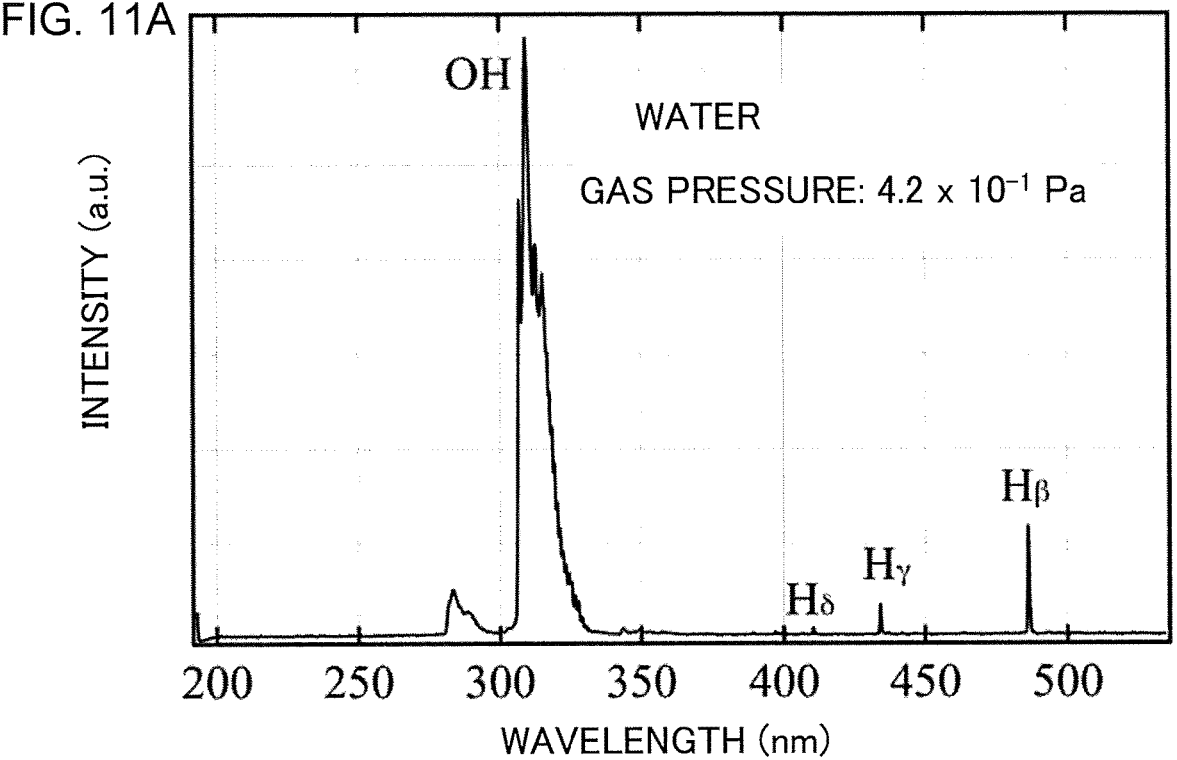
FIG. 11A shows an optical spectrum of a gas generated using water vapor as the raw material gas in the radical source according to the Example.
Figure 11B:
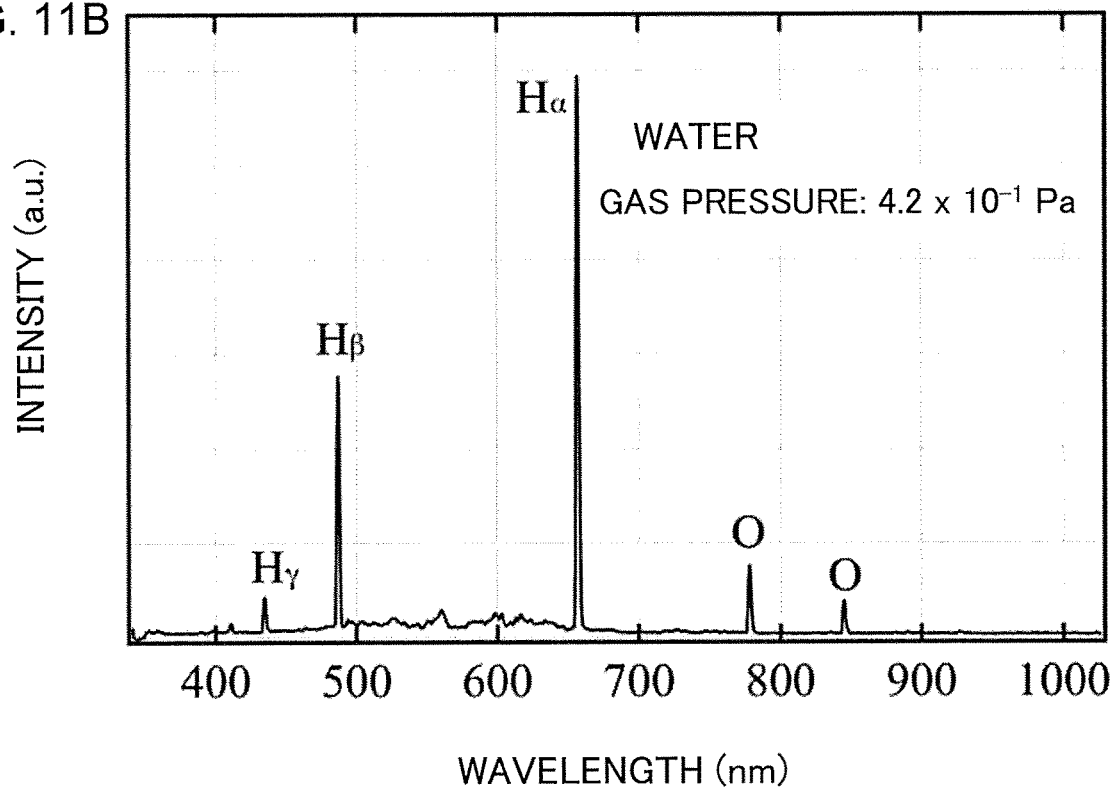
FIG. 11B shows an optical spectrum of the gas generated using water vapor as the raw material gas in the radical source according to the Example.

FIGS. 11A and 11B are optical spectra of the gas generated using water vapor as the raw material gas in the radical source according to this Example. The pressure of water vapor introduced into the radical source was $4.2 \times 10^{-1}$ Pa.

Figure 12:
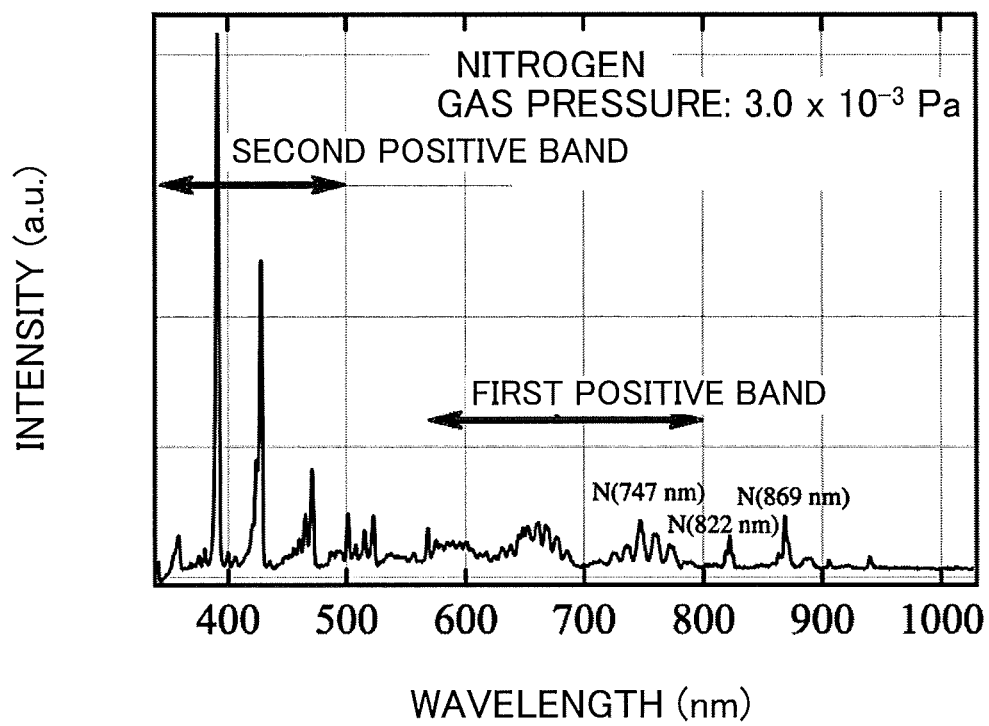
FIG. 12 shows an optical spectrum of a gas generated using nitrogen as the raw material gas in the radical source according to the Example.

FIG. 12 is an optical spectrum of the gas generated using nitrogen as the raw material gas in the radical source according to this Example. The pressure of the nitrogen gas introduced into the radical source was $3.0 \times 10^{-3}$ Pa. The peaks were observed that correspond to a first excitation positive band (first positive band) derived from the $5\Sigma g+$ molecular state and a second excitation positive band (second positive band) derived from the $C3\Pi u+$ molecular state having a higher energy rank.

Example 5

Hydrogen, water vapor, and nitrogen were individually introduced as the raw material gas into an inductively coupled microwave radical source having the same structure as the one illustrated in the example of FIG. 4 to cause high-frequency (2.45 GHz) vacuum discharge to generate radicals. The inner diameter (radius) of the opening of the inductively coupled microwave radical source constituting a connection part for connection to a connection vacuum container was 4.4 mm and an emission spectrum was acquired with an exposure time of 10 msec at a position 17 mm from the opening.

Figure 13A:
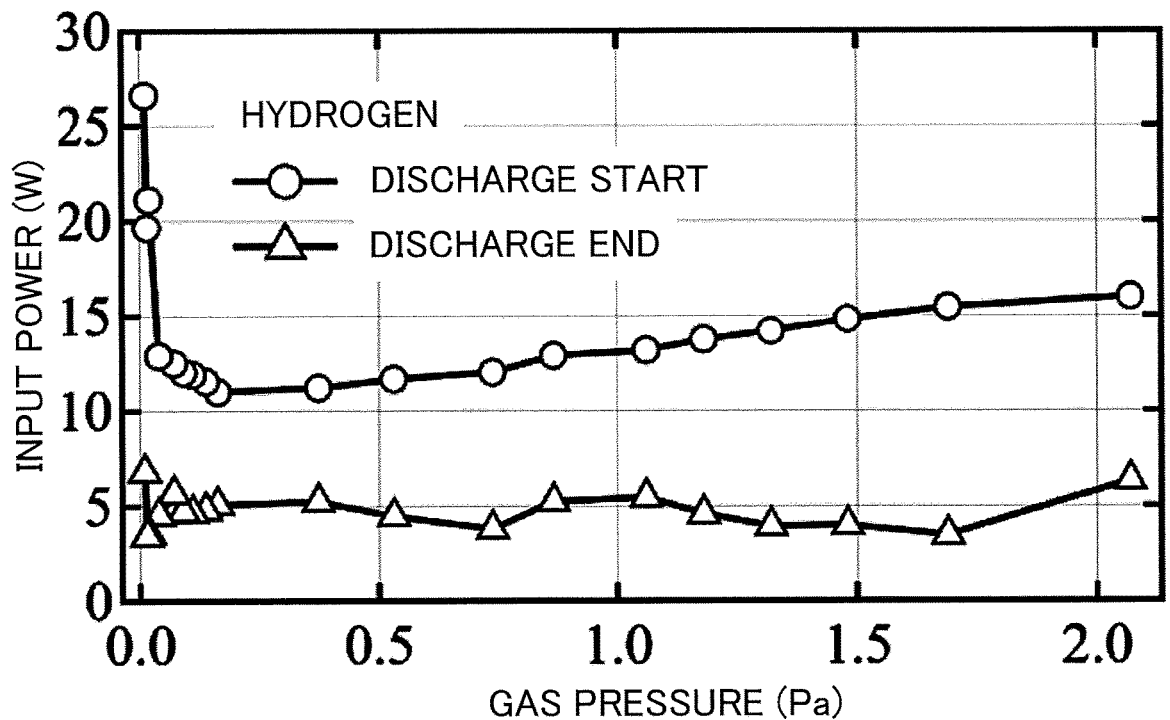
FIG. 13A shows a graph showing the discharge characteristics of a radical source according to an Example with hydrogen being used as the raw material gas.
Figure 13B:
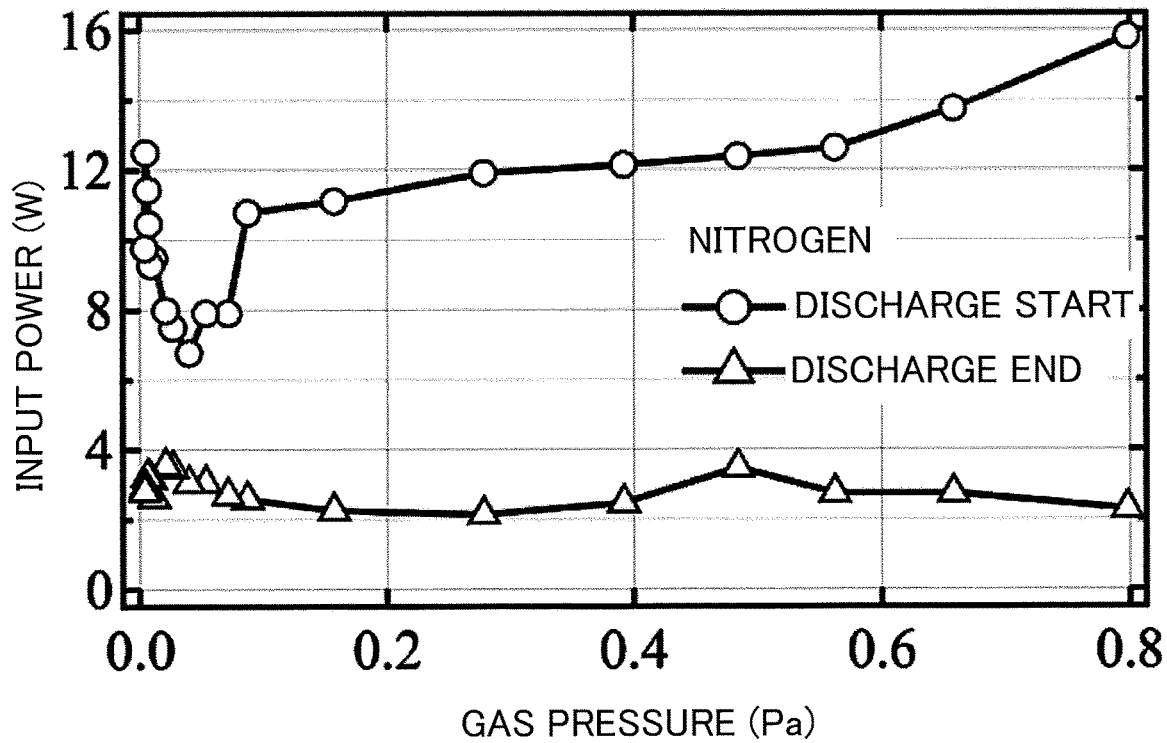
FIG. 13B shows a graph showing the discharge characteristics of the radical source according to the Example with nitrogen being used as the raw material gas.

FIG. 13A is a graph showing the discharge characteristics of the radical source according to this Example in the case where hydrogen is used as the raw material gas. The input powers at the start of discharge and at the end of discharge with respect to the pressure of the hydrogen gas are shown. FIG. 13B is a graph showing the discharge characteristics of the radical source according to this Example in the case where nitrogen was used as the raw material gas. The input powers at the start of discharge and at the end of discharge with respect to the pressure of the nitrogen gas are shown.

Figure 14A:
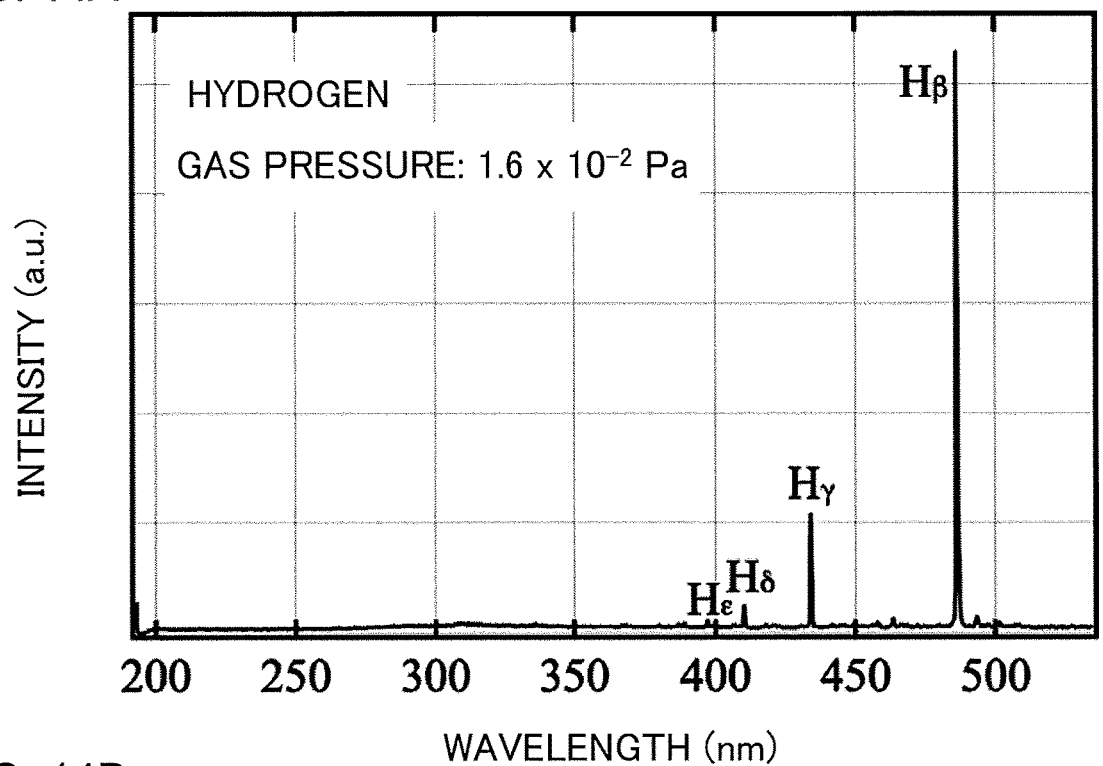
FIG. 14A shows an optical spectrum of a gas generated in the radical source according to the Example using hydrogen as the raw material gas.
Figure 14B:
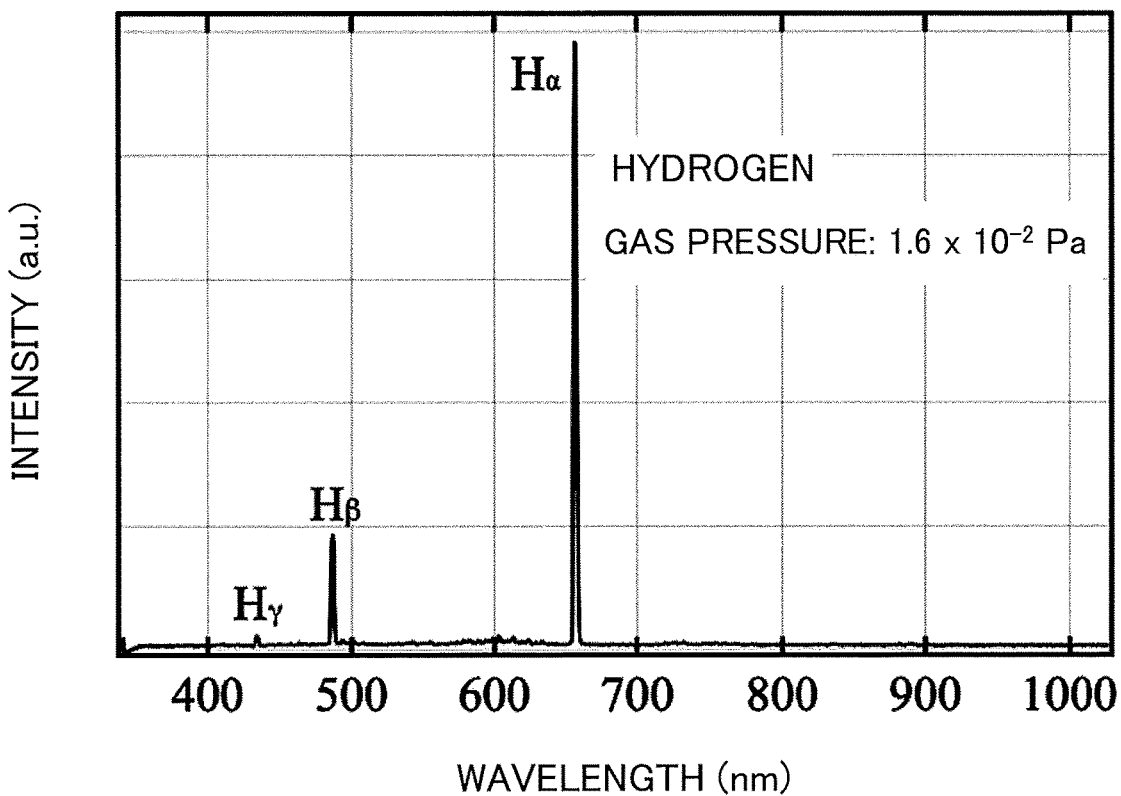
FIG. 14B shows an optical spectrum of the gas generated in the radical source according to the Example using hydrogen as the raw material gas.

FIGS. 14A and 14B are optical spectra of the gas generated using hydrogen as the raw material gas in the radical source according to this Example. The pressure of the hydrogen gas introduced into the radical source was $1.6 \times 10^{-2}$ Pa.

Figure 15A:
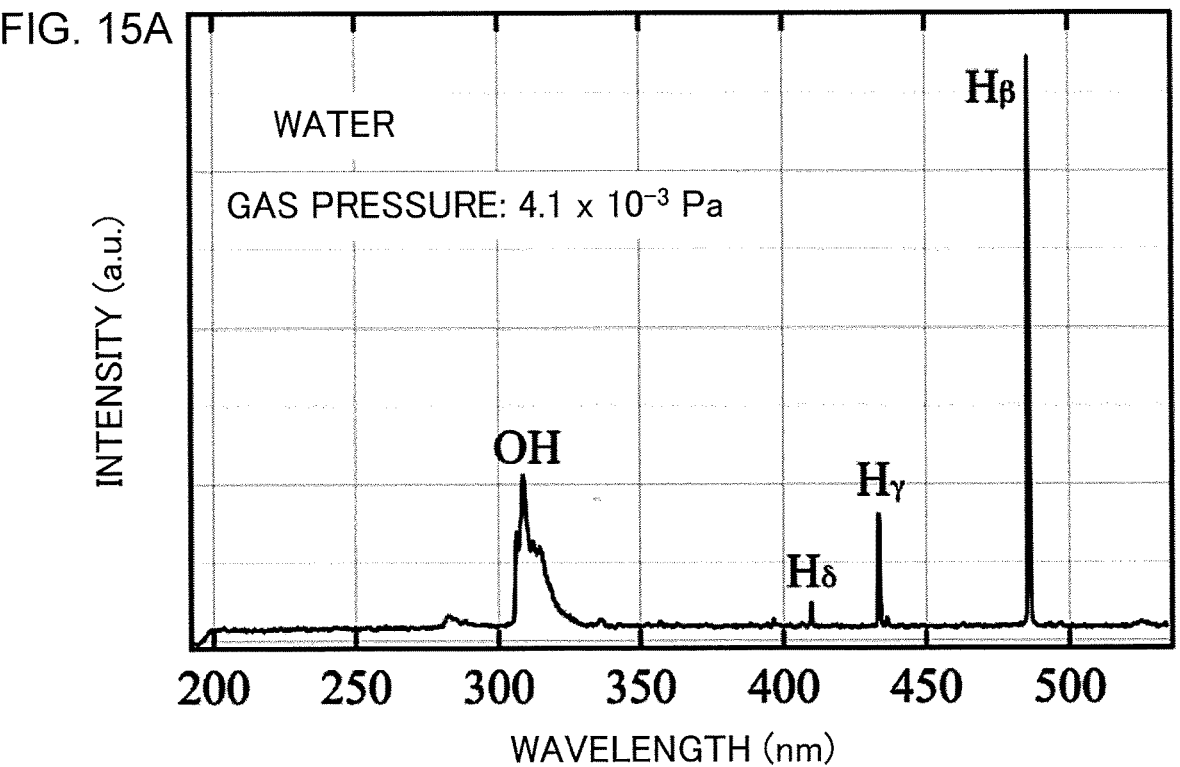
FIG. 15A shows an optical spectrum of a gas generated in the radical source according to the Example using water vapor as the raw material gas.
Figure 15B:
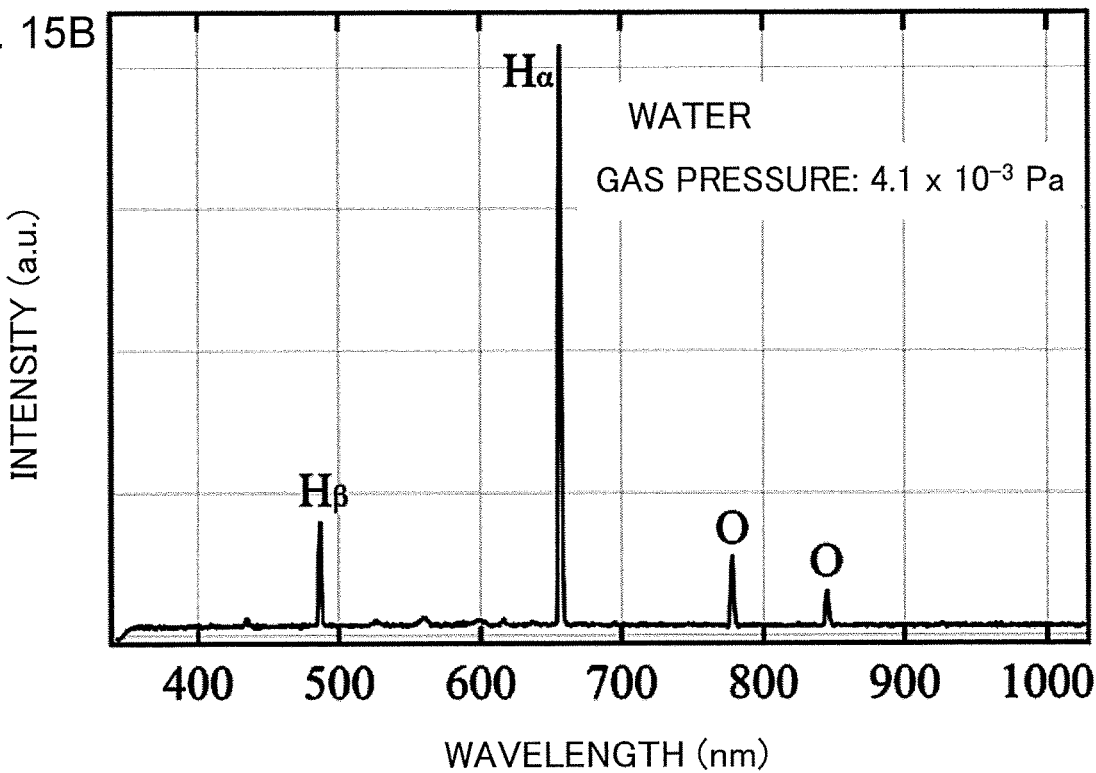
FIG. 15B shows an optical spectrum of the gas generated in the radical source according to the Example using water vapor as the raw material gas.

FIGS. 15A and 15B are optical spectra of the gas generated using water vapor as the raw material gas in the radical source according to this Example. The pressure of the water vapor introduced into the radical source was $4.1 \times 10^{-3}$ Pa.

Figure 16:
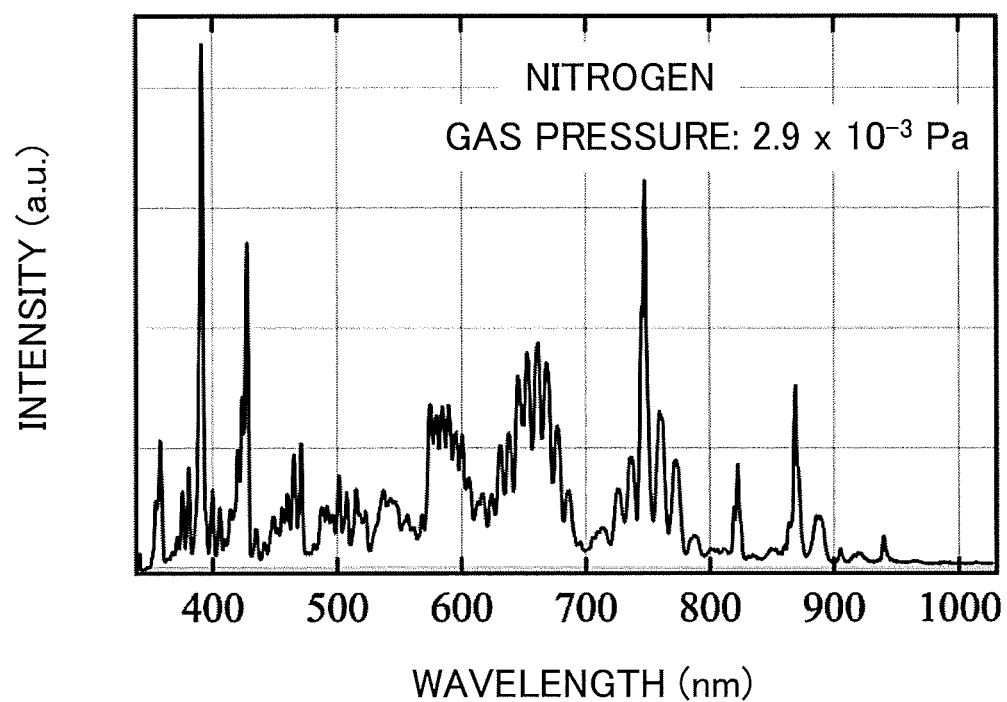
FIG. 16 shows an optical spectrum of a gas generated in the radical source according to the Example using nitrogen as the raw material gas.

FIG. 16 is an optical spectrum of the gas generated using nitrogen as the raw material gas in the radical source according to the Example. The pressure of the nitrogen gas introduced into the radical source was $2.9 \times 10^{-3}$ Pa.

REFERENCE SIGNS LIST

1 . . . analytical device, 10 . . . ionization unit, 20 . . . reaction unit, 22 . . . cooling gas/CID gas supply unit, 23 . . . radical supply unit, 24 . . . connection vacuum container, 31 . . . mass separation unit, 32 . . . detection unit, 40 . . . information processing unit, control unit, 51 . . . analysis unit, 52 . . . device control unit, 100 . . . measurement unit, 216 . . . radical introduction unit; 232 . . . high-frequency power supply, 233 . . . coaxial cable, 300a, 300b . . . radical generation unit; 310a, 310b . . . raw material introduction chamber, 311a, 311b . . . raw material introduction tube, 312a . . . electrically conductive capillary, 313a, 313b . . . raw material gas introduction port, 315 . . . electrically conductive ribbon, 320 . . . ground electrode, 321a, 321b . . . connection part; 330 . . . glass tube, 340a, 340b . . . matching part, 341 . . . gap, 350 . . . high-frequency input part, 360 . . . flange, 370 . . . magnet, Ax . . . central axis of raw material introduction tube, S: ion derived from a sample component

The invention claimed is:

1. An analytical device, comprising:
   a reaction unit into which an ion derived from a sample component is introduced;
   a radical generation unit that generates a radical by vacuum discharge and comprises a raw material introduction chamber into which a plasma raw material is introduced;
   a connection part that introduces the radical generated in the radical generation unit into a vacuum chamber, the vacuum chamber having a pressure lower than a pressure of the raw material introduction chamber and being connected to the reaction unit; and
   a separation unit that separates a generated ion generated by a reaction with the radical introduced via the connection part into the reaction unit according to m/z and/or ion mobility, wherein
   an inner diameter of a cross section of the connection part is equal to or less than 20 millimeters.

2. The analytical device according to claim 1, wherein:
   the radical generation unit comprises an alternating-current coupling circuit, the alternating-current coupling circuit comprising: a high-frequency input part that inputs a high-frequency voltage to the alternating-current coupling circuit; and a matching part configured to change an electrical characteristic of the alternating-current coupling circuit.

3. The analytical device according to claim 2, wherein:
   a frequency of the high-frequency voltage is 1 MHz or higher but not higher than 300 GHz.

4. The analytical device according to claim 2, wherein:
   the high-frequency input part and a power source of the high-frequency voltage are interconnected without a matching device therebetween.

5. The analytical device according to claim 2, wherein:
   the matching part comprises a movable unit configured to change an impedance of the alternating-current coupling circuit by movement of the movable unit.

6. The analytical device according to claim 2, wherein:
   the raw material introduction chamber comprises a first electrically conductive body into which the plasma raw material is introduced; and
   the first electrically conductive body is tubular and constitutes a part of the alternating-current coupling circuit.

7. The analytical device according to claim 6, wherein:
   the matching part changes a portion of the first electrically conductive body that is tubular, the portion constituting the part of the alternating-current coupling circuit.

8. The analytical device according to claim 6, wherein:
   the vacuum discharge occurs at the end of the first electrically conductive body that is tubular.

9. The analytical device according to claim 2, wherein:
   the raw material introduction chamber comprises a tubular dielectric body into which the plasma raw material is introduced; and
   the radical generation unit comprises a second electrically conductive body wound around the dielectric body, the second electrically conductive body constituting a part of the alternating-current coupling circuit.

10. The analytical device according to claim 9, wherein:
    the matching part changes a portion of the second electrically conductive body, the portion constituting the part of the alternating-current coupling circuit.

11. The analytical device according to claim 9, wherein:
    the vacuum discharge occurs inside the tubular dielectric body.

12. The analytical device according to claim 2, wherein:
    the raw material introduction chamber has an outer wall placed under atmospheric pressure.

13. The analytical device according to claim 2, wherein:
    the plasma raw material contains at least one raw material gas selected from a group consisting of hydrogen gas, water vapor, nitrogen gas, and air.

14. The analytical device according to claim 1, wherein:
    the generated ion generated in the reaction unit is a first ion resulting from the ion derived from the sample component being dissociated by the reaction with the radicals, a second ion resulting from an atom or atom group attaching to the ion derived from the sample component, or an ion resulting from the second ion being dissociated.

* * * * *